US012354469B2

(12) United States Patent
Hascher et al.

(10) Patent No.: US 12,354,469 B2
(45) Date of Patent: Jul. 8, 2025

(54) SYSTEM AND METHOD FOR VOICE ACTUATED CONFIGURATION OF A CONTROLLING DEVICE

(71) Applicant: Universal Electronics Inc., Scottsdale, AZ (US)

(72) Inventors: Thomas Hascher, Gronau (DE); Jason Godwin, Enschede (NL); Joseph Lee Haughawout, Aliso Viejo, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 18/534,938

(22) Filed: Dec. 11, 2023

(65) Prior Publication Data

US 2025/0191460 A1 Jun. 12, 2025

(51) Int. Cl.
*G08C 17/02* (2006.01)

(52) U.S. Cl.
CPC ......... *G08C 17/02* (2013.01); *G08C 2201/20* (2013.01); *G08C 2201/42* (2013.01); *G08C 2201/50* (2013.01)

(58) Field of Classification Search
CPC G08C 17/02; G08C 2201/20; G08C 2201/31; G08C 2201/42; G08C 2201/50; H04N 21/42204; G10L 15/22; G10L 2015/223
See application file for complete search history.

(56) References Cited

U.S. PATENT DOCUMENTS 4,703,359 A 10/1987 Rumbolt
4,959,810 A 9/1990 Darbee
5,247,580 A * 9/1993 Kimura ................ H04B 10/114 704/E15.045
5,255,313 A 10/1993 Darbee
5,481,256 A 1/1996 Darbee
5,515,052 A 5/1996 Darbee
5,552,917 A 9/1996 Darbee
5,614,906 A 3/1997 Hayes
5,959,751 A 9/1999 Darbee
6,014,092 A 1/2000 Darbee
6,195,033 B1 2/2001 Darbee
6,931,231 B1 8/2005 Griffin
6,957,086 B2 * 10/2005 Bahl ....................... H04L 69/18 455/73
7,026,957 B2 * 4/2006 Rubenstein ......... B60R 16/0373 340/988
7,093,003 B2 8/2006 Yuh
7,612,685 B2 11/2009 Harris
(Continued)

OTHER PUBLICATIONS

International Search Report and Written Opinion of application No. PCT/US24/59119, dated Jan. 15, 2025, 9 pp.

*Primary Examiner* — Adnan Aziz
(74) *Attorney, Agent, or Firm* — Greenberg Traurig, LLP

(57) ABSTRACT

A speech recognition engine is provided voice data indicative of at least a brand of a target appliance. The speech recognition engine uses the voice data indicative of at least a brand of the target appliance to identify within a library of codesets at least one codeset that is cross-referenced to the brand of the target appliance. The at least one codeset so identified is then caused to be provisioned to the controlling device for use in commanding functional operations of the target appliance.

7 Claims, 23 Drawing Sheets

(56) References Cited

U.S. PATENT DOCUMENTS

| | | | | |
|---|---|---|---|---|
| 7,944,370 | B1 * | 5/2011 | Harris | G08C 17/02 340/12.28 |
| 8,700,106 | B2 | 4/2014 | Hilbrink | |
| 9,852,615 | B2 | 12/2017 | Perez | |
| 10,235,873 | B2 | 3/2019 | Thompson | |
| 10,325,596 | B1 * | 6/2019 | Tran | G10L 15/1822 |
| 2003/0095212 | A1 * | 5/2003 | Ishihara | G08C 23/04 704/E15.045 |
| 2006/0235701 | A1 * | 10/2006 | Cane | H04N 21/42204 704/E15.045 |
| 2009/0239587 | A1 * | 9/2009 | Negron | H04L 12/2836 455/566 |
| 2009/0254778 | A1 * | 10/2009 | Huang | G06F 3/04842 714/38.12 |
| 2013/0132094 | A1 * | 5/2013 | Lim | H04N 21/8186 704/E11.001 |
| 2014/0344627 | A1 * | 11/2014 | Schaub | G06F 3/167 714/46 |
| 2015/0162006 | A1 * | 6/2015 | Kummer | H04N 21/41265 704/275 |
| 2022/0076559 | A1 * | 3/2022 | Haughawout | G08C 17/02 |
| 2022/0139395 | A1 | 5/2022 | Mutagi | |
| 2022/0157157 | A1 | 5/2022 | Arling | |

* cited by examiner

Brand/model/codeset database

Brand record

Model record

SYSTEM AND METHOD FOR VOICE ACTUATED CONFIGURATION OF A CONTROLLING DEVICE

BACKGROUND

This following generally relates to remote control systems and, more particularly, to a system and method for setting up and configuring a controlling device such as a universal remote control to command functions of one or more types of remotely controllable appliances of one or more manufacturers. Exemplary types of appliances include, but are not limited to televisions, AV receivers, cable or satellite set top boxes (STBs), DVD players, digital video recorders (DVRs), thermostats, game consoles, etc.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls and/or universal remote control application software for commanding various functions of various types of appliances of various manufacturers have become quite widespread. By way of example, universal remote controls are described in commonly assigned U.S. Pat. Nos. 4,959,810, 5,255,313 and 5,552,917.

In a common method of setting up a universal remote control, codes for commanding functions of an appliance are learned from a remote control supplied by the manufacturer with that appliance. The learned codes, which are stored within the universal remote control, are then available for subsequent transmission to the appliance. Alternatively, codes for commanding functions of appliances of various types and various manufacturers may be preprogrammed into the universal remote control. The user may then interact with the universal remote control to identify to the universal remote control which appliance(s) the user desires to command, i.e., the user manually enters an appliance or brand code, usually obtained from a tabulation in a printed user manual or the like, into the universal remote control and the universal remote control utilizes that user provided identity information to access those preprogrammed codes that are appropriate for commanding the identified appliance(s). In this regard, examples of known methods for performing an initial setup of a universal remote control may be found in, for example, the above mentioned U.S. Pat. No. 4,959,810 as well as U.S. Pat. No. 5,614,906, entitled "Method for Selecting a Remote Control Command Set," or U.S. Pat. No. 4,703,359 entitled "Universal Remote Control Unit with Model Identification Capability," each of which is incorporated herein by reference in its entirety.

As an alternative to printed tabulations and the like, various methods have been proposed based on the use of a personal computer to access listings of appliance identification data and/or command codes. Examples of such methods may be found in U.S. Pat. No. 7,612,685 entitled "Online remote control configuration system" or U.S. Pat. No. 10,235,873 entitled "System and Method to Facilitate Configuration of a Universal Controlling Device," both of which are incorporated herein by reference in their entirety.

Furthermore, in certain instances the user of a controlling device, whether universal or not, may be provided with the ability to customize the functionality of the controlling device, for example by rearranging which functions are assigned to which keys, by adding lesser-used key functions which were not part of the default command set provisioned on the controlling device, etc. Once again, such operations may be performed by entering data obtained from a tabulation in a printed user manual, as described for example in U.S. Pat. No. 5,515,052 entitled "Universal Remote Control with Function Synthesis," or by utilizing a personal computer and/or an Internet based service such as described for example in U.S. Pat. No. 7,093,003 entitled "System and Method for Upgrading the Remote Control Functionality of a Device," both patents of common ownership and incorporated herein by reference in their entirety.

Still further, U.S. Publication No. 2022/0139395, incorporated herein by reference in its entirety, describes a system and method that causes a controlling device to use voice data indicative of at least a type for and a brand of a target appliance received via a microphone associated with the controlling device to directly identify within a library of codesets stored in a memory of the controlling device at least one codeset that is cross-referenced within the memory of the controlling device to the type for and the brand of the target appliance and to cause the at least one codeset to be used by the controlling device when commanding functional operations of the target appliance.

SUMMARY

The subject disclosure generally relates to controlling devices such as universal remote controls, and more specifically to improved methods for setup and configuration of such devices, i.e., the identification and selection of appropriate sets of command data to be associated with the specific appliances to be controlled. To this end, the subject system and method leverages the embedded technology of a voice remote control to search for and find the correct control codes for a specific device and brand of controllable appliance. This search could be localized, limited to the on-board memory of the remote control, or could utilize a connection to the cloud to leverage a broader set of brands, models, and codesets.

A better understanding of the objects, advantages, features, properties and relationships of the invention claimed hereinafter will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention claimed, reference may be had to preferred embodiments shown in the attached drawings in which:

DETAILED DESCRIPTION

Figure 1A:
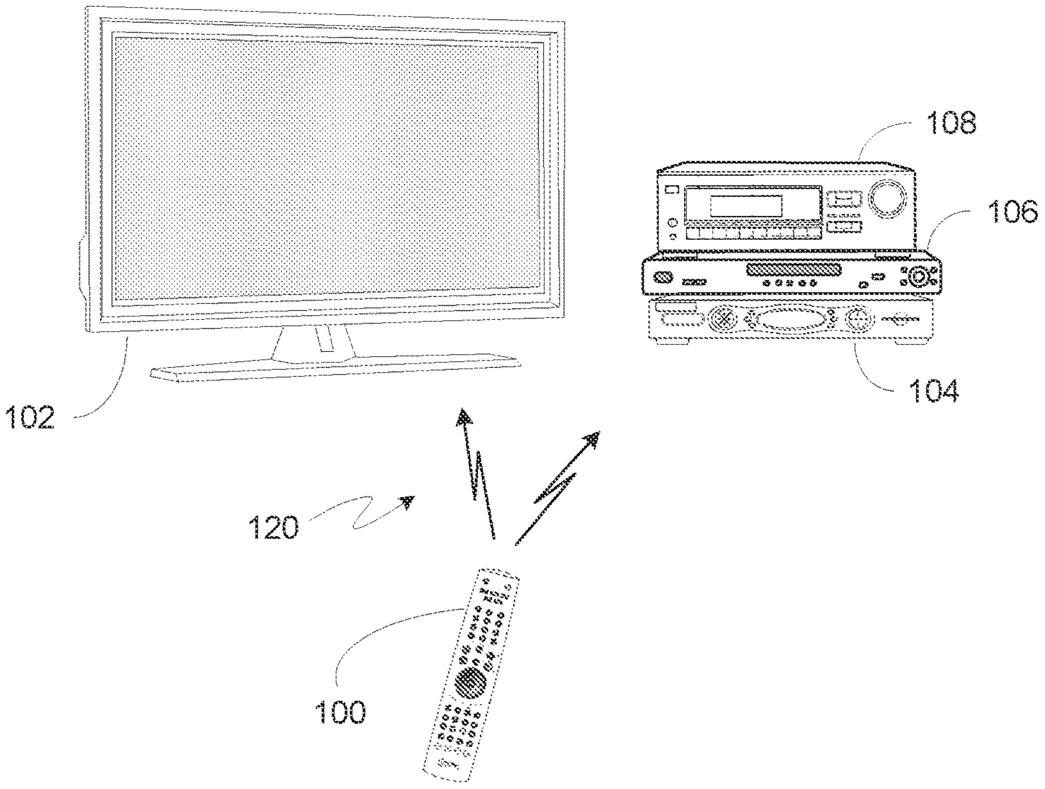
FIGS. 1*a* and 1*b* illustrate exemplary systems in which controlling devices in accordance with the instant invention may utilized.

Turning now to FIG. 1*a*, there is illustrated an exemplary system in which a controlling device 100 is configured to control various controllable appliances, such as a television 102, a set top box ("STB") 104, a DVD player 106 and an AV receiver 108. As is known in the art, the controlling device 100 may be capable of transmitting commands to the appliances, using any convenient IR, RF, Point-to-Point, or networked protocol command signals 120, to cause the appliances to perform operational functions. While illustrated in the context of a television 102, STB 104, DVD player 106 and AV receiver 108, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 1B:
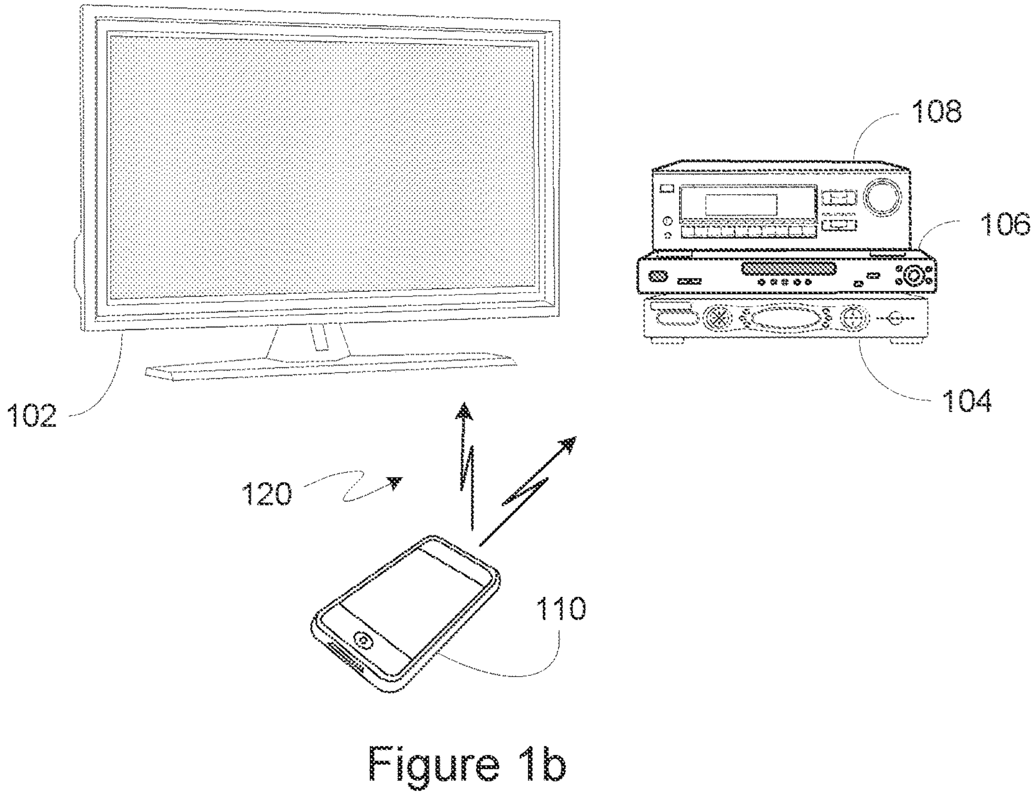

FIG. 1*b* illustrates a second exemplary system which is similar to that of FIG. 1*a*, but where controlling device functionality may be embodied in a user-installed application software module (generally known in the art as an "app") resident in a smart device 110, which device may comprise any of a smart phone, a tablet computer, a portable email device, an e-book, a hand-held game and/or game controller, a portable media player, etc. As will be appreciated, in this instance the physical capability for transmitting appliance command signals 120 may be provided by an external adapter, for example as described in U.S. Pat. No. 6,931,231 entitled "Infrared Generator From Audio Signal Source," by a relay device, for example as described in co-pending U.S. patent application Ser. No. 13/071,661 entitled "System and Method for Facilitating Appliance Control Via a Smart Device," or may be built into the smart device, for example as described in co-pending U.S. patent application Ser. No. 13/043,915 entitled "System and Method for Provision of Infrared Signaling in Smart Phones," all of which patents and patent applications are incorporated herein by reference in their entirety.

Figure 2:
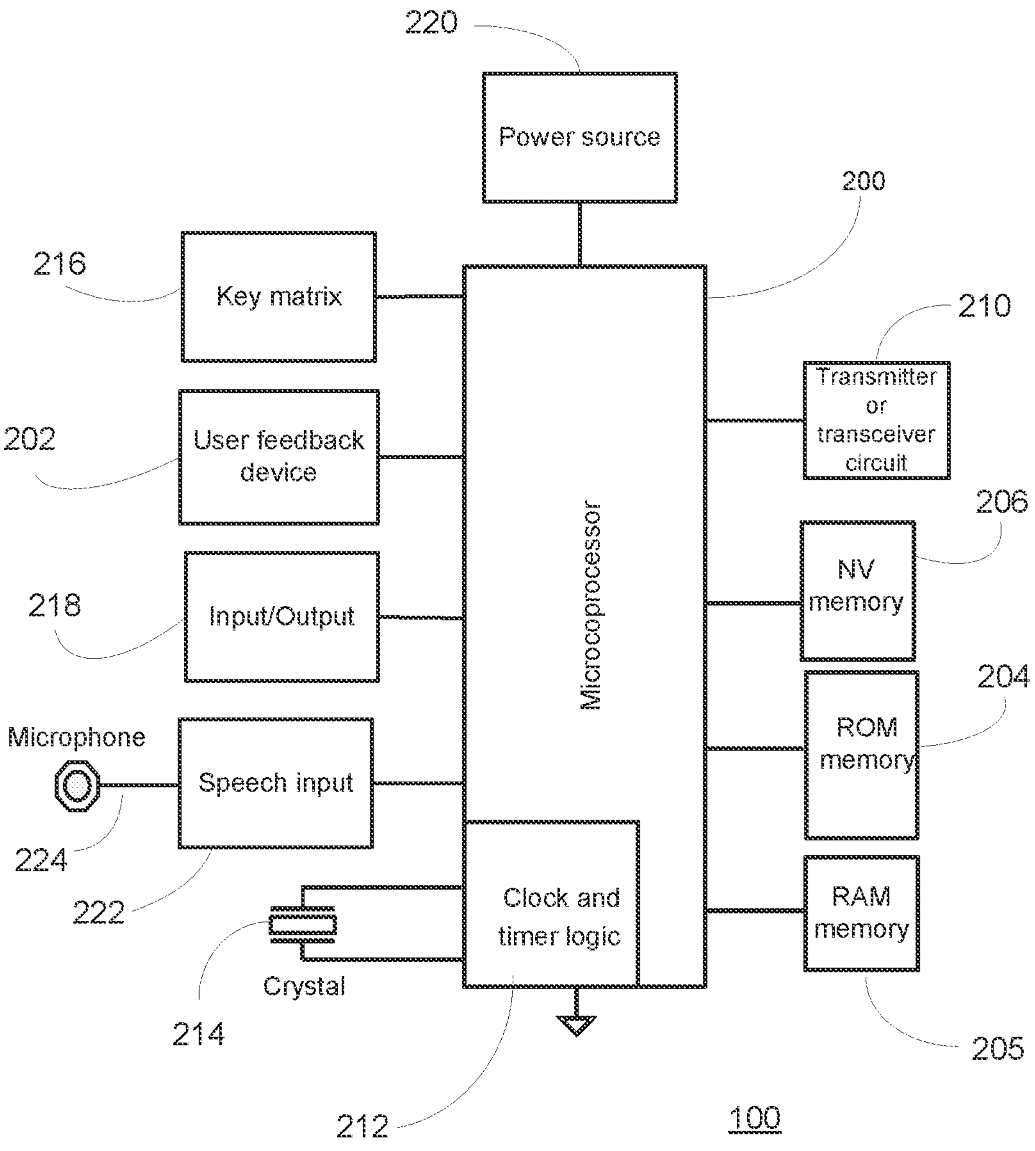
FIG. 2 illustrates a block diagram of exemplary components of the controlling device of FIG. 1*a;*

With reference to FIG. 2, a first exemplary embodiment of a controlling device 100 for use in commanding the functional operations of one or more appliances may include, as needed for a particular application, a processor 200 coupled to a ROM memory 204, a RAM memory 205, a key matrix 216 (e.g., hard keys, soft keys such as a touch sensitive surface overlaid on a liquid crystal (LCD), and/or an electroluminescent (EL) display), transmission circuit(s) and/or transceiver circuit(s) 210 (e.g., IR and/or RF), a non-volatile read/write memory 206, a means 202 to provide feedback to the user (e.g., one or more LEDs, illuminable keys, display, buzzer, voice synthesizer with associated speaker, and/or the like), an input/output port 218 such as a serial interface, USB port, modem, Zigbee, WiFi, or Bluetooth transceiver, etc., a power source 220 such as a battery, and clock and timer logic 212 with associated crystal or resonator 214 and speech input means comprising a microphone 224 and associated circuitry 222 for example an analog to digital converter, speech digitizer, etc., as known in the art.

As will be understood by those skilled in the art, some or all of the memories 204, 205, 206 may include executable instructions (collectively, the controlling device program memory) that are intended to be executed by the processor 200 to control the operation of the controlling device 100, as well as data which serves to define the necessary control protocols and command values for use in transmitting command signals to controllable appliances (collectively, the command data). In this manner, the processor 200 may be programmed to control the various electronic components within the controlling device 100, e.g., to monitor the key matrix 216, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, sensed sound input, etc. In response to an event, appropriate instructions within the program memory (hereafter the "controlling device operating program") may be executed. For example, when a command function key is actuated on the controlling device 100, the controlling device 100 may retrieve from the command data stored in memory 204, 205, 206 a command value and control protocol corresponding to the actuated function key and, where necessary, current device mode and transmit that command to an intended target appliance, e.g., STB 106, in a format recognizable by that appliance to thereby control one or more functional operations of that appliance. It will be appreciated that the controlling device operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

In some embodiments, controlling device 100 may be of the universal type, that is provisioned with a library comprising a multiplicity of command codes and protocols suitable for controlling various appliances—also referred to as sets of command data or codesets. In such cases, for selecting sets of command data to be associated with the specific appliances to be controlled (hereafter referred to as a setup procedure), data may be provided to the controlling device 100 that serves to identify each intended target appliance by its make, and/or model, and/or type. In the embodiment presented, this data may be in the form of spoken input as will be described in greater detail hereafter. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment.

Figure 3:
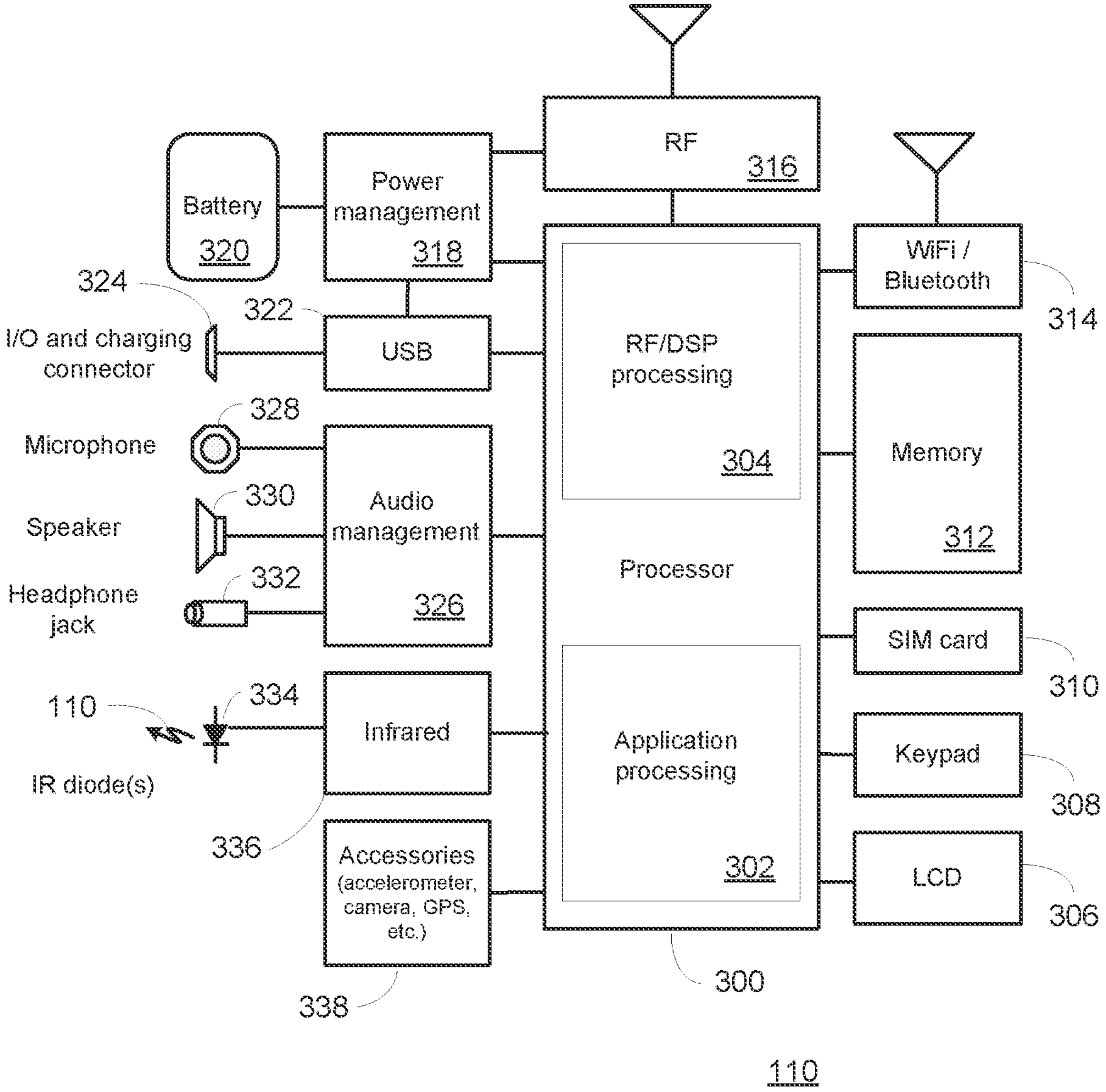
FIG. 3 illustrates a block diagram of exemplary components of the controlling device of FIG. 1*b;*

In an alternative embodiment controlling device functionality may take the form of a software app resident in a smart device 110. A representative smart device, illustrated in FIG. 3 in the form of a smart phone, may include as needed for a particular application, processing means 300 which may comprise both an application processing section 302 and an RF/DSP processing section 304; an LCD display 306; a keypad 308 which may comprise physical keys, touch keys overlaying LCD 306, or a combination thereof; a subscriber identification module (SIM) card 310; memory means 312 which may comprise ROM, RAM, Flash, or any combination thereof; WiFi and/or Bluetooth wireless interface(s) 314; a wireless telephony interface 316; power management circuitry 318 with associated battery 320; a USB interface 322 and connector 324; an audio management system 326 with associated microphone 328, speaker 330, and headphone jack 332; built-in or add on IR communication means comprising a transmitter and/or receiver 336 with associated IR output diode(s) 334; and various optional accessory features 338 such as a digital camera, GPS, accelerometer, etc.

It is known to offer an app for download and installation into memory 312 which app may serve to allow use of the smart phone to transmit commands suitable for operation of entertainment and other appliances. Such an app may draw on a library of codesets suitable for commanding the functional operations of various types of appliances of multiple manufactures and/or models, i.e., a library of codesets for a so-called "universal" controller, as well known in the art. As appropriate for a particular embodiment this library may be resident on the smart device itself, either downloaded as part of or in conjunction with the app or preinstalled in memory 312 or in a separate self-contained command transmitter; may be located externally at a local PC or remote server device accessible to smart device 110 for the download of only those code sets necessary for operation of the configured appliances; or may be located in a command relay device such as described in the previously referenced U.S. patent application Ser. No. 13/043,915.

In either of these exemplary embodiments, during setup and configuration of the controlling device, a user my provide appliance identification via spoken input as will now be described in conjunction with the flowchart of FIG. 4. Since the steps involved are similar for either embodiment, it is to be understood that in the following descriptions, except where otherwise indicated the term "controlling device" is intended to encompass, mutatis mutandis, exemplary controlling device 100, exemplary controlling device 110, and all equivalents thereof.

Figure 5A:
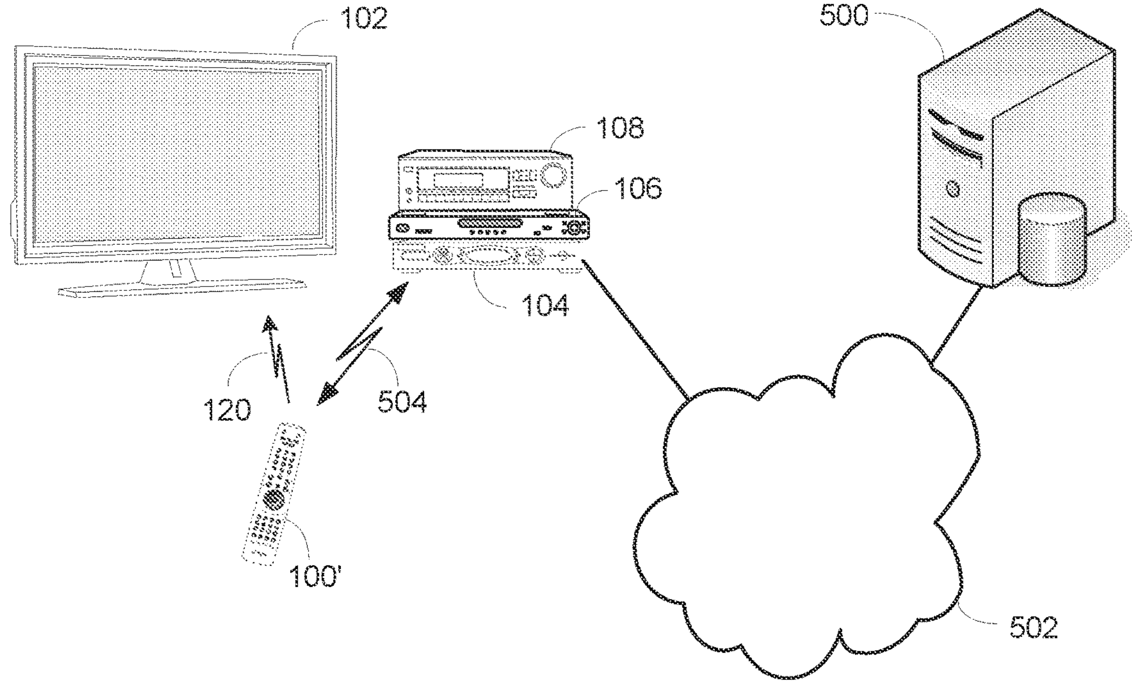
FIGS. 5*a* and 5*b* further illustrate exemplary systems in which controlling devices may be configured in accordance with the method of FIG. 4.

Initially, at step 400 a user may place the controlling device into a setup mode, for example by activating a "setup" key, by selecting that item from a displayed menu of choices, by a voice command, or any other method as appropriate for a particular embodiment. In this context, it will be appreciated that in certain embodiments wherein a controlling device, such as for example controlling device 100' of FIG. 5*a*, may be enabled to communicate bidirectionally 504 with an appliance such as for example STB 104, the abovementioned menu displays and any other user prompts, messages, etc., may be presented on a connected appliance such as for example TV 102.

Figure 5B:
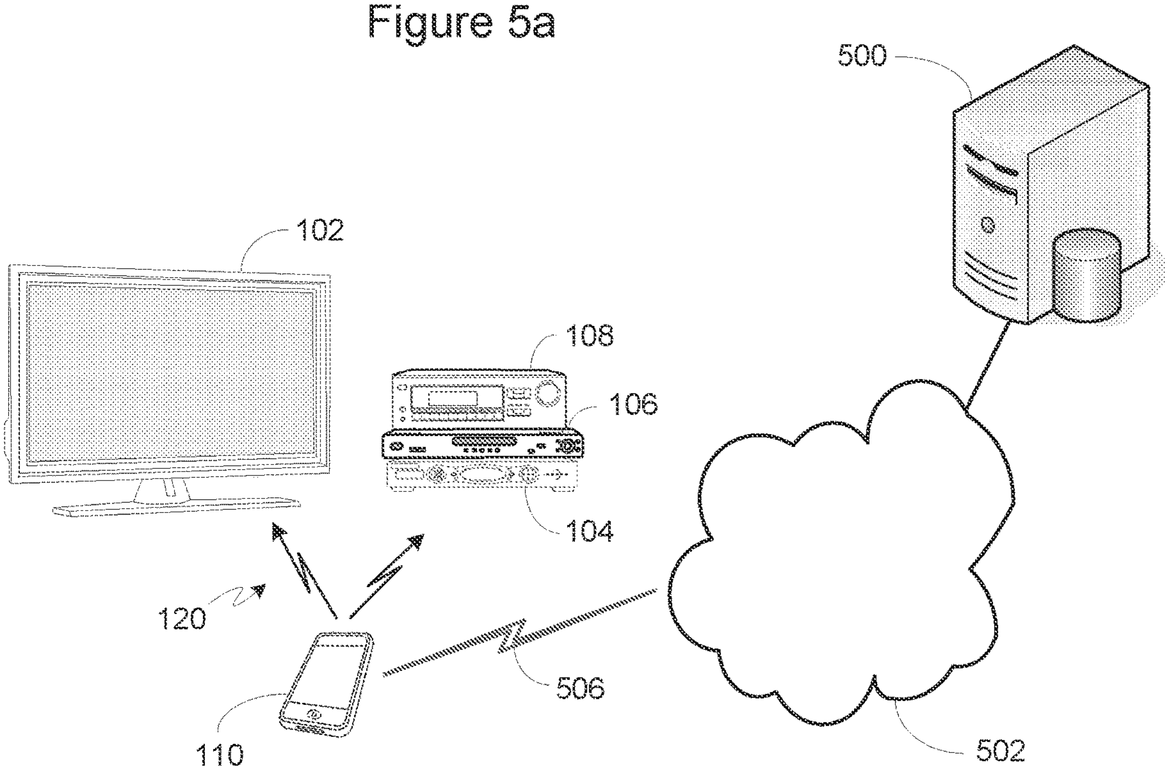

Once the setup mode has been initiated, at step 402 the controlling device may prompt the user to speak the brand name of the appliance to be added to the configuration of the controlling device. This and subsequent prompts for voice input may take the form of an illuminated LED and/or "speak" symbol, a displayed text or image, a synthesized spoken message (e.g., where controlling device user feedback means 202 comprises speech synthesis means and a speaker, or where a smart device app has access to speaker 330), etc. The resulting spoken syllables may be digitized and presented to a speech recognition means for processing and comparison to a phonetic database of brand names which have been cross referenced to appropriate codesets within the library of codesets. As appropriate for a particular embodiment, all or part of said speech recognition processing may be performed by programming on the controlling device itself; or, with reference to FIGS. 5*a* and 5*b*, may be performed by programming on a local appliance such as STB 104 which is in bidirectional communication 504 with the controlling device; or may be performed by programming resident on a remote server 500 accessible via a network 502 such as the Internet or PSTN. In the latter case, access to such network may be via an intermediary appliance such as STB 104, illustrated at 506, or may be via a local network connection 506, such as WiFi or Bluetooth, through a gateway device such as a router (not illustrated). As will be appreciated, in those embodiments where the captured voice input data is to be forwarded to another device, in some embodiments it may be subject to initial preprocessing, compression, etc., by programming in the controlling device.

At step 404, if the speech recognition means is unable to uniquely identify the desired brand, step 402 may be repeated in order to solicit additional identifying information from the user. For example, a user may be presented with a short list of possible brand identities from which to select; may be prompted to spell the first few characters of the brand name; may be requested to speak the name of a geographic region or a service provider; etc.; as appropriate to facilitate the identification process.

Once a brand has been successfully identified, at step 406 the user may be prompted to provide spoken appliance type and/or model number information for processing and comparison to a phonetic database of model number data which is applicable to the identified brand, if necessary, e.g., to further narrow down the codeset choices. As will be appreciated, in many manufacturer model numbering systems the appliance type may be inferred from an assigned model number, and accordingly in certain embodiments the appliance type may not be initially requested. However in instances where a model number alone may be insufficient, or in embodiments where availability of an appliance type may facilitate model number recognition processing by providing a context to limit the extent of the database search, an appliance type may comprise part of the initial request. At step 408 the spoken syllables comprising the model identity may be processed and compared to a phonetic database of model numbers by the speech recognition means which have also been cross referenced to codesets within a library of codesets. If the initially provided model information is insufficient to uniquely identify the appliance, at step 410 additional user input may be solicited. For example, a user may be requested to indicate a device type if this was not already provided; to provide geographic region or service provider; to select from a series of displayed images of appliances and/or OEM remote controls; etc. As an alternative to, or in conjunction with the above, in some embodiments a group of test codes each corresponding to a predetermined command function (for example "power") in one of several different command data formats may be downloaded into or otherwise indicated to the controlling device, to allow a user to determine by experimentation which one of a group of possible command codesets is applicable to his appliance, for example as described in the previously referenced U.S. Pat. No. 5,614,906 entitled "Method for Selecting a Remote Control Command Set."

Once a suitable command code set has been uniquely identified, at step 412 the desired setup data may be communicated to the controlling device operating program or remote control app, as appropriate for the device being configured. Depending upon the particular embodiment, communication of the setup data may comprise downloading of a complete set of command code data into the controlling device from an off-platform database of codesets located for example on local appliance such as STB 104 or on a remote server 500; or may comprise simply communicating a set up number or other pointer to an entry in a database of command codes already preloaded into the memory of the controlling device. Thereafter, at step 414 the user may be prompted to indicate if they wish to configure additional appliances. If so, the process may be repeated starting at step 402. If not, the current appliance configuration session is complete and the controlling device exits setup mode.

In an additional aspect of the invention, once the appliances to be controlled have been identified to a controlling device as described above or by any other convenient method, a user may be enabled to further customize individual key functionality via voice input. In this regard, since many OEM remote controls may include a large number of key functions some of which may be infrequently used or of interest only to certain classes of users, the initial setup configuration of many universal controlling devices may include only a subset of the total functionality of an appliance's OEM remote, comprising the most commonly used functions. By way of example, Tables 1a and 1b below illustrate a specific set of remote control commands which may be supported by a particular model of DVD player. Table 1a lists those commonly used commands which may be included in the default key configuration of a typical universal controlling device, while Table 1b lists additional or "extended" functions which may be unique to this particular DVD player and/or may perform seldom used operations.

TABLE 1

| DVD player standard functions | | |
|---|---|---|
| Power on | Fast forward | Menu |
| Power off | Fast reverse | Up/down |
| Digits 0-9 | Skip forward | Left/right |
| Play | Skip reverse | Select |
| Pause | Stop | Open/close |

TABLE 1-continued

| DVD player brand xxxx model yyyy extended functions | | |
|---|---|---|
| Angle | HDMI mode | Repeat |
| A-B | Marker | Search |
| Audio | Picture adjust | Setup |
| Dimmer | Pure direct | Source |
| Disc layer | Random | Zoom |

Nevertheless, a user of a universal controlling device may from time to time desire to issue appliance commands corresponding to one or more of the extended functions supported by his particular appliance model. Various methods have been proposed to enable a user to customize universal controlling device key functionality by adding available extended functions not initially available as part of the default setup. By way of example, descriptions of such methods may be found in U.S. Pat. No. 5,515,052 entitled "Universal Remote Control with Function Synthesis" or U.S. Pat. No. 7,093,003 entitled "System and Method for Upgrading the Remote Control Functionality of a Device," both of common ownership and incorporated herein by reference in their entirety.

Further, since different appliance manufacturers may use differing terminology for the same function, a generic function label used for a key on a universal controlling device may not always correspond to the term used by the original equipment manufacturer to reference that function. By way of example, Table 2 below lists some of the known synonyms for the command function which may be used to cause a device such as a TV set or STB to tune from a currently selected channel to the immediately previous channel, which function may simply be labeled with the generic term "Last" on the keypad of a universal controlling device.

TABLE 2

| "Last channel" synonyms | | |
|---|---|---|
| Alternate channel | Go back | Quick view |
| Back | Jump | Recall |
| Channel recall | Last channel | Return |
| Channel return | Previous channel | Revue |
| Flashback | Swap | R-Tune |

Accordingly, in addition to facilitating the initial configuration of appliances to be controlled, in some embodiments the speech recognition capabilities described herein may be further adapted to provide a convenient and rapid method for a user of a controlling device to access specific functions of his configured appliance via voice commands. As will become apparent, such extended function access may be for the purpose of issuing an immediate one-time command transmission or may be for the purpose of assigning the identified command function to a key of the controlling device for future appliance operating convenience.

Figure 6:
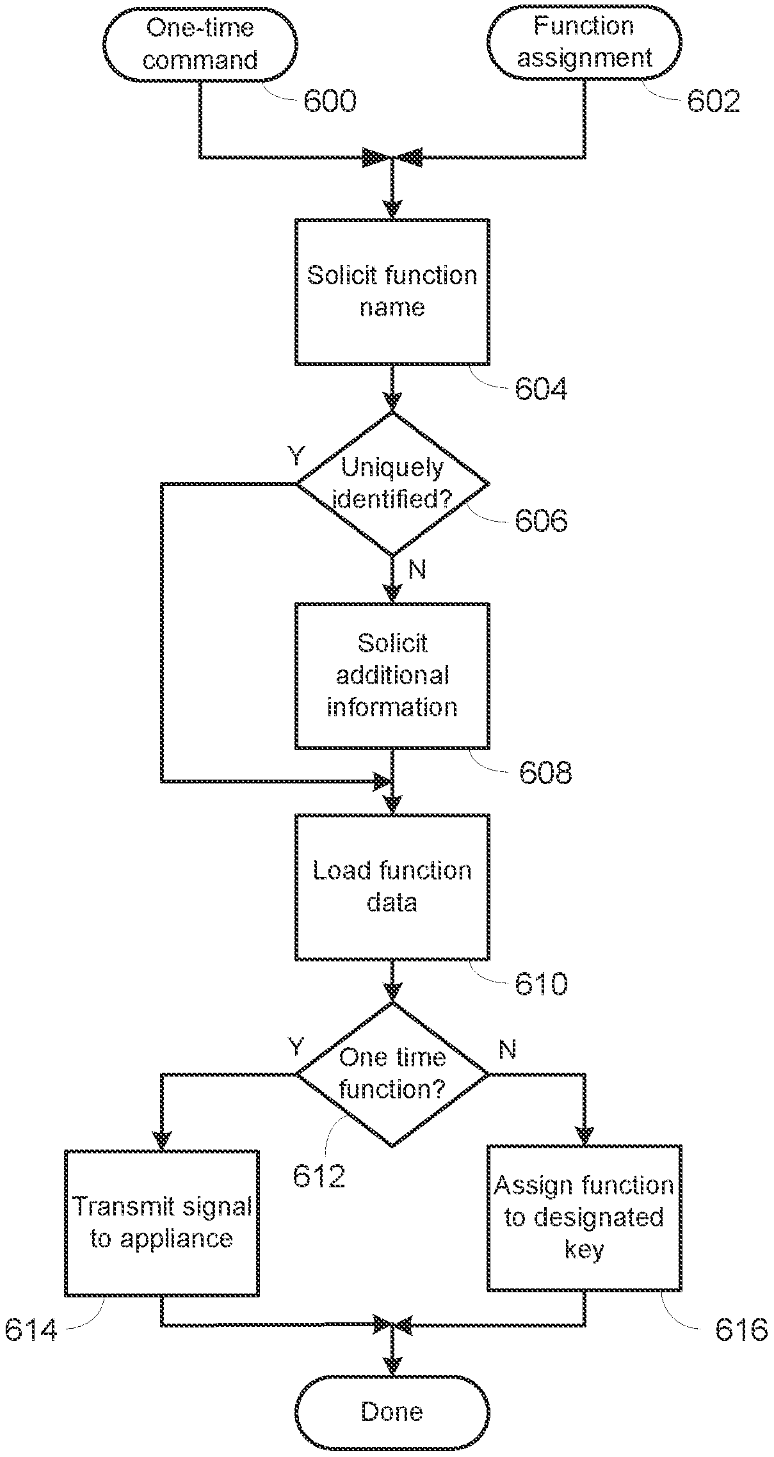
FIG. 6 illustrates an exemplary method for accessing extended functions of a configured appliance using spoken input.

Turning now to the flowchart of FIG. 6, an exemplary extended function access method may be initiated at steps 600 or 602. As before, initiation may take the form of a key activation, menu selection, spoken input, etc., as appropriate for a particular embodiment. Initiation at step 600 may be for the purpose of issuing a one-time or immediate appliance command, while initiation at step 602 may be for the purpose of assigning an appliance command function to a key of the controlling device. Step 602 may thus include an indication of the particular controlling device key which is to be reconfigured. Regardless of the purpose, at step 604 the user may be prompted to speak the desired function name. As before this prompt may take the form of an illuminated LED and/or "speak" symbol, a displayed text or image, etc., as appropriate. The resulting spoken syllables may be digitized and presented to a speech recognition means for processing and comparison to a phonetic database of command function names which have been cross referenced to command data within a codeset that is applicable to the particular appliance model currently configured, for example as illustrated in Table 1b above. As with the methods described previously, all or part of said speech recognition processing may be performed by programming on the controlling device itself; may be performed by programming on a local appliance which is in bidirectional communication with the controlling device; or may be performed by programming resident on a remote server accessible via a network such as the Internet or PSTN.

At step 604 it may be determined if the spoken input has sufficed to uniquely identify the desired command function. If not at step 608 additional information may be solicited from the user to assist in identifying the desired command function. By way of example, a user may be requested to indicate a geographic region or the approximate age of an appliance; may be presented with a display of short list of function names from which to select; may be requested to provide synonym(s) for the desired command function: etc. Once the desired function has been uniquely identified, at step 610 the indicated command code data may be provisioned to the controlling device. As appropriate for the particular implementation, such provisioning may comprise downloading the data itself, supply of a pointer to an entry in a local database, etc. Thereafter, at step 612 it may be determined if the request was for a one-time command transmission (i.e., originated by step 600) or for assignment of the function to a key (i.e., originated by step 602). If for a one-time transmission, at step 614 the provisioned data may be utilized to transmit the desired command to the target appliance. If for assignment of the function to a key, at step 616 the new function may be assigned to the indicated key, for example using an entry in a key reassignment table such as described in U.S. Pat. No. 6,195,033 entitled "Key Mover," of common ownership and incorporated herein by reference in its entirety.

Figure 7A:
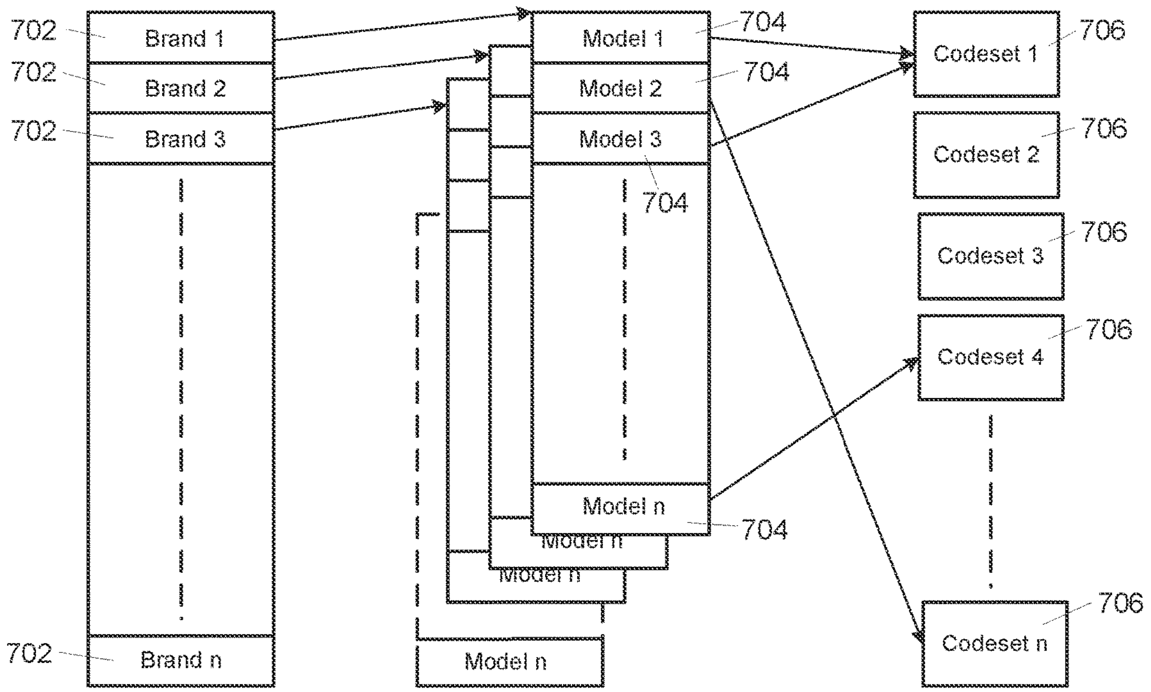
FIGS. 7*a* and 7*b* illustrate the structure of a brand name, model number, and command code database suitable for use in conjunction with the methods of FIGS. 4 and 6.
Figure 7A:
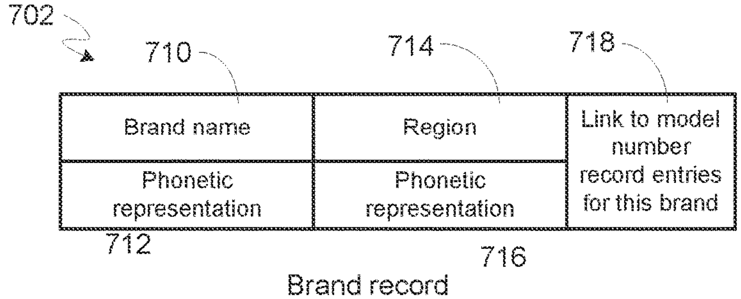
Figure 7A:
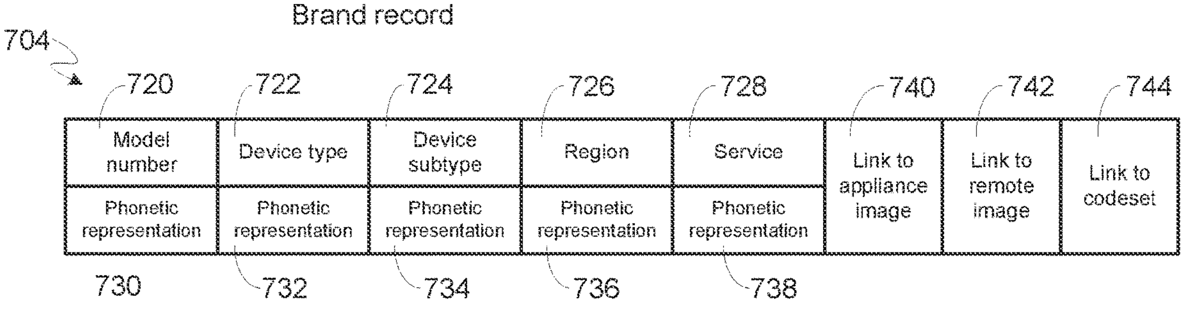

With reference to FIGS. 7*a*, the structure of an exemplary appliance command code database for use in conjunction with the methods of FIGS. 5 and 6 may comprise a series of brand records 702 each of which points to a group of model records 704 specific to that brand, each model record in turn pointing to a codeset record 706 containing command code data, function labels, etc., which are applicable to that specific brand and model of appliance. It will be appreciated that since multiple models of a manufacturer's appliance may share the same OEM remote control design and/or command code set, there may not be a one-to-one correspondence between model number records 704 and codeset records 706.

Each brand record 702 may comprise a brand name entry comprising a text representation 710 of the brand name together with a phonetic representation 712 of that brand name comprising digitized phoneme templates, cepstral coefficients, or vectors, etc., as appropriate for the speech recognition algorithms of a particular embodiment. Brand records may also include an entry 714 which may identify a geographic region, together with its phonetic representation 716. By way of example, region information may be requested from a user if a spoken brand name is not immediately identified at step 404 of FIG. 4, and used to filter search results when multiple possible matches were initially identified. Alternatively, in some embodiments where the database is to be used to support multiple territories, multiple entries may be created for a particular brand name in order to cater for regional differences in accent or pronunciation, in which case the region information may be used to preselect those entries which are to participate in a search. As will be appreciated, in embodiments which are Internet server based region information may be derivable from the IP address associated with the requesting device, and thus in those cases the region identification step may be performed automatically. Region information might also be automatically gathered using the GPS capabilities of a smart device, the network tower information of a network on which a smart device resides, etc. The final entry of a brand name record may take the form of a pointer 718 to a group of model number records comprising appliance models which correspond to the indicated brand.

Each model number record 704 may comprise text entries for model number 720, appliance type 722 (e.g. DVD) and subtype 724 (e.g. Blu-ray), region 726, and service provider (e.g. cable MSO, satellite, etc.) together with corresponding phonetic representations 730 through 736. As before, the data contained in the device type, subtype, region, and provider entries may be utilized to refine model selection, for example as described in conjunction with step 410 of FIG. 4. Additionally, model record 704 may also include a link 740 to an image of the appliance and/or a link 742 to an image of the original equipment remote control, again for possible use in refining a user's identification of his exact appliance model. As will be appreciated, not all of the above fields may be populated in every model record. Finally, each model number record 704 may contain a link 744 to a codeset record.

Figure 7B:
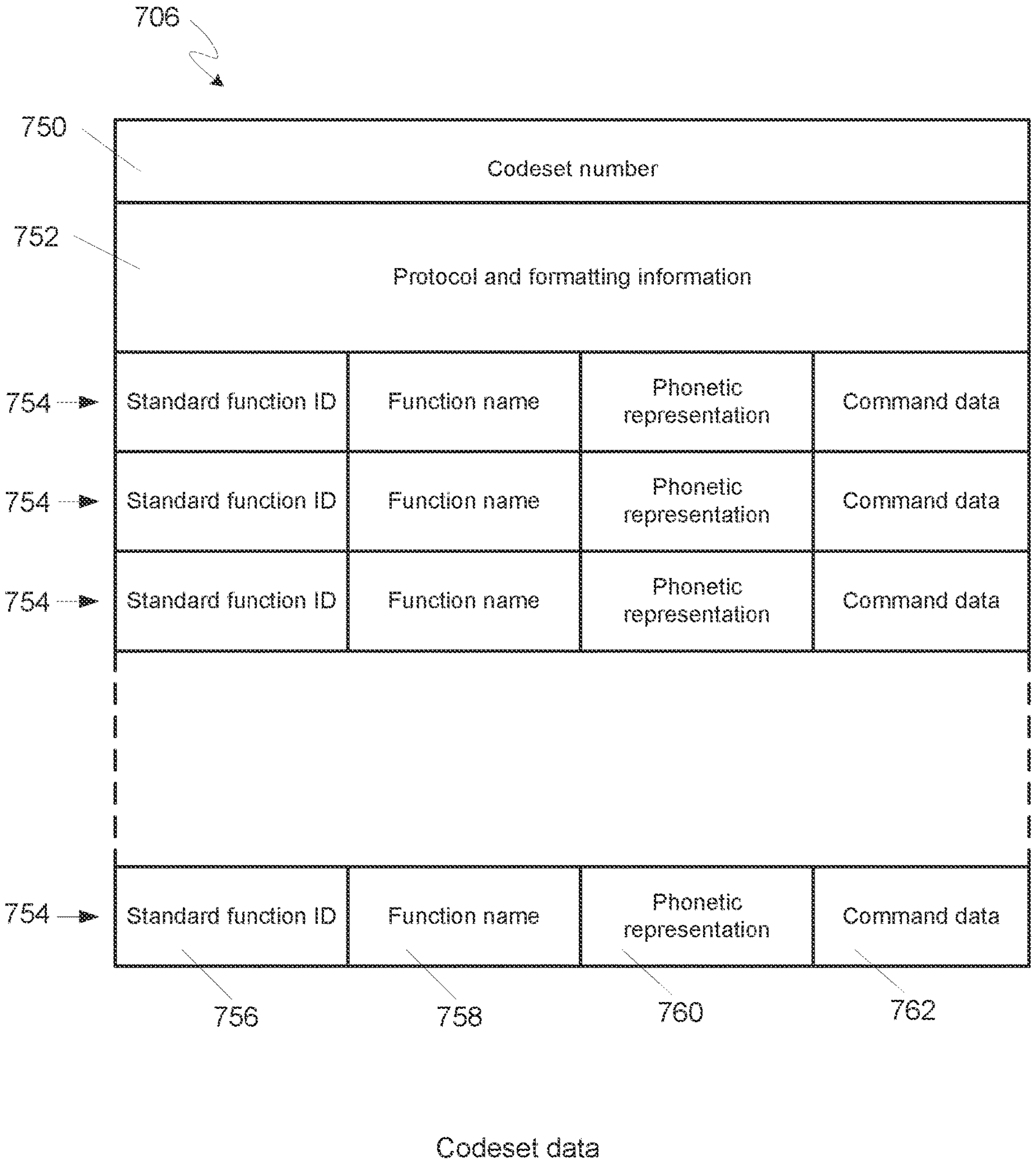

With reference to FIG. 7*b*, each code set record 706 may comprise a unique codeset identity number, a block of protocol and formatting information 752 which may describe the physical protocol requirements for transmitting the command data elements which comprise this codeset, including for example items such as carrier frequency, bit encoding, data frame size and structure, appliance address, parity, or CRC requirements, etc. Following block 752 may be a series of individual command function entries 754. Each entry may comprise a standard function ID 756, which may be a normalized tag indicative of the function or operation invoked by this command (i.e. so that within a universal remote control system the same functionality may be mapped to a key regardless of any variations in appliance manufacturer-specific nomenclature, for example as may be seen in Table 2 above); a function name 758 corresponding to the name by which that function is commonly referenced by this appliance's manufacturer together with its phonetic representation 760; and command data 762 which, when transmitted using the protocol specifications of block 752, will command the appliance to perform the indicated action. In some embodiments, multiple instances of function name 758 and associated phonetic representation 760 may be present to cater for synonyms and/or regional differences.

Figure 4:
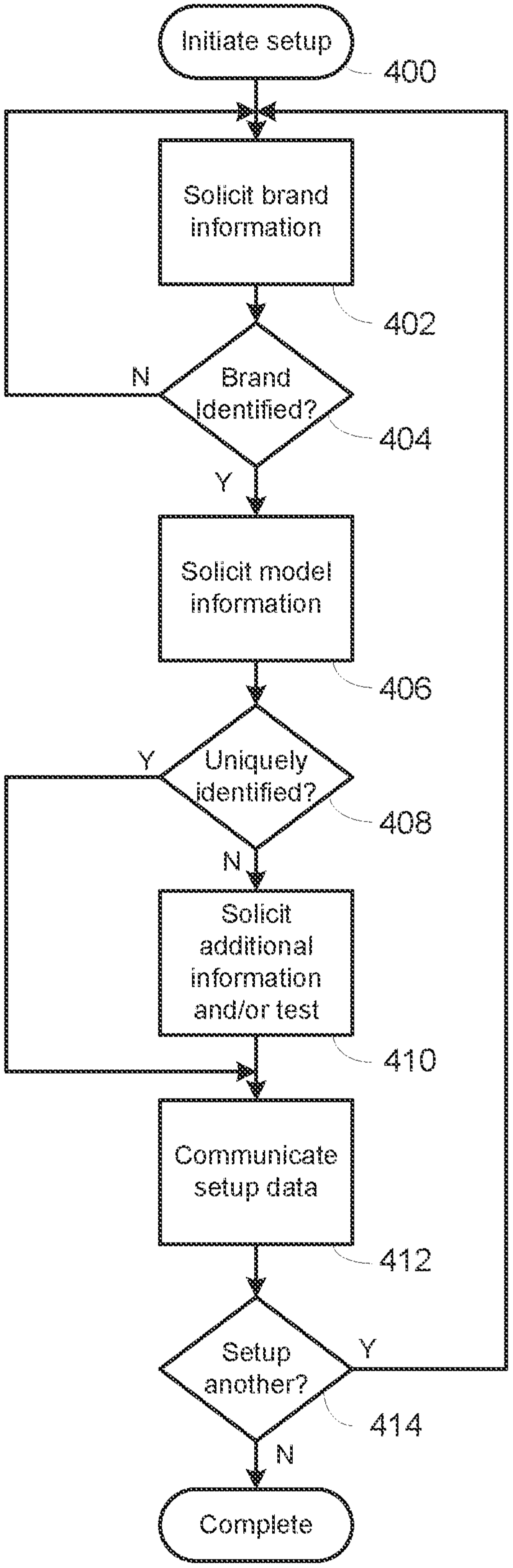
FIG. 4 illustrates an exemplary method for configuration of a controlling device to match an appliance to be controlled using spoken input.

As will be appreciated, at step 412 of FIG. 4, all or part of the information contained in the identified codeset record may be transferred to the controlling device being configured. As appropriate for a particular embodiment, such a transfer may comprise only the codeset number 750 where it is determined that the required codeset is already preloaded in the memory of the controlling device or a local appliance or may comprise a full download of codeset number 750, protocol and formatting information 752, and all or a portion of the command data entries 762. Furthermore, in order to identify user-requested extended command functions, the phonetic representations 758 corresponding to the command function entries of the codeset number corresponding to the currently configured appliance may be searched by the speech recognition means, for example as illustrated at steps 604 and 606 of FIG. 6, and the matching command data returned to the requesting controlling device as illustrated 610 of FIG. 6.

Figure 8:
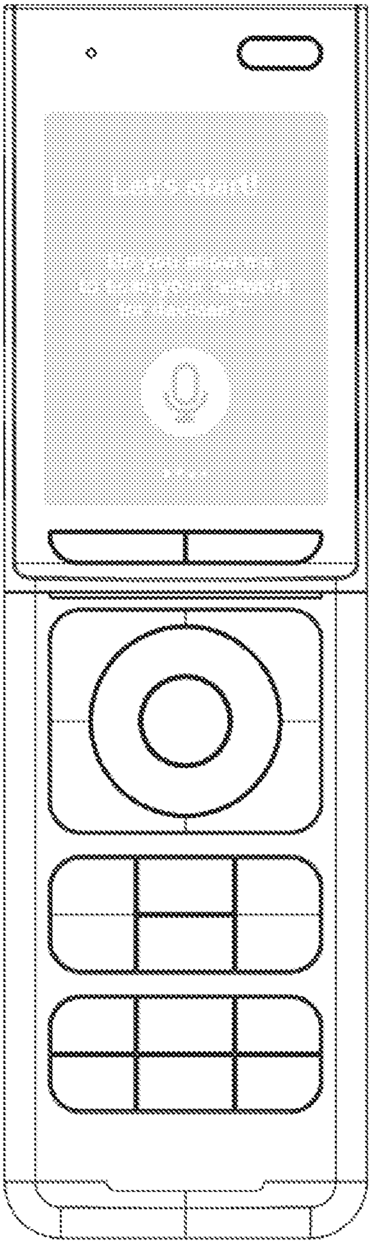
FIGS. 8-25 illustrate user interfaces provided to facilitate configuring an app for use in controlling one or more controllable appliances.
Figure 9:
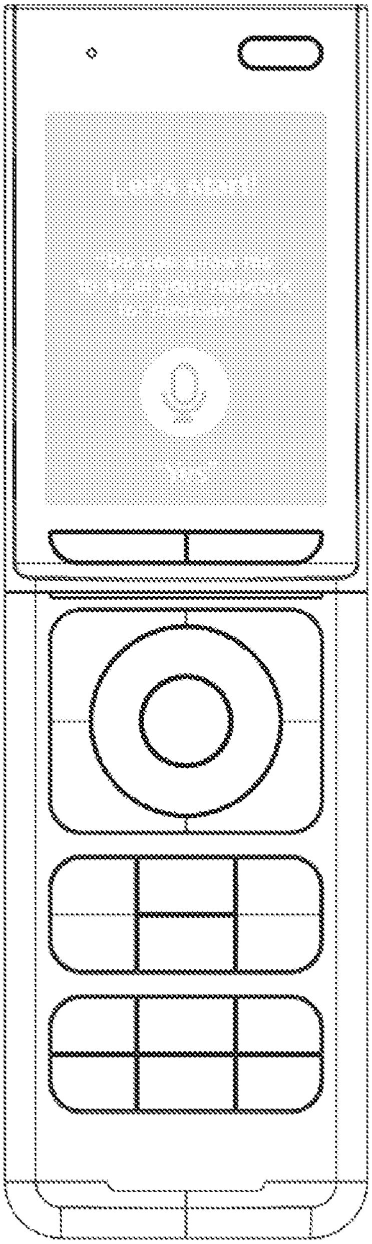

In a further example, a user will be provided with an app for downloading to a smart device. Once the app is downloaded and installed, the user will be prompted to provide information required to allow the app/smart device to access a local area network, e.g., to perform WiFi setup. Once the app/smart device is connected to the local area network, the app will be capable of performing auto-detection and auto-setup operations, such as described in U.S. Publication No. 2022/0157157 which is incorporated herein by reference in its entirety. As shown in FIG. 8, the app may require (and may prompt the user for) voiced permission from the user before performing the auto-detection related operations. As additionally shown in FIG. 9, a conformation of the verbally provided permission may be presented back to the user, for example by being displayed and/or by being voiced via use of a speaker.

Figure 10:
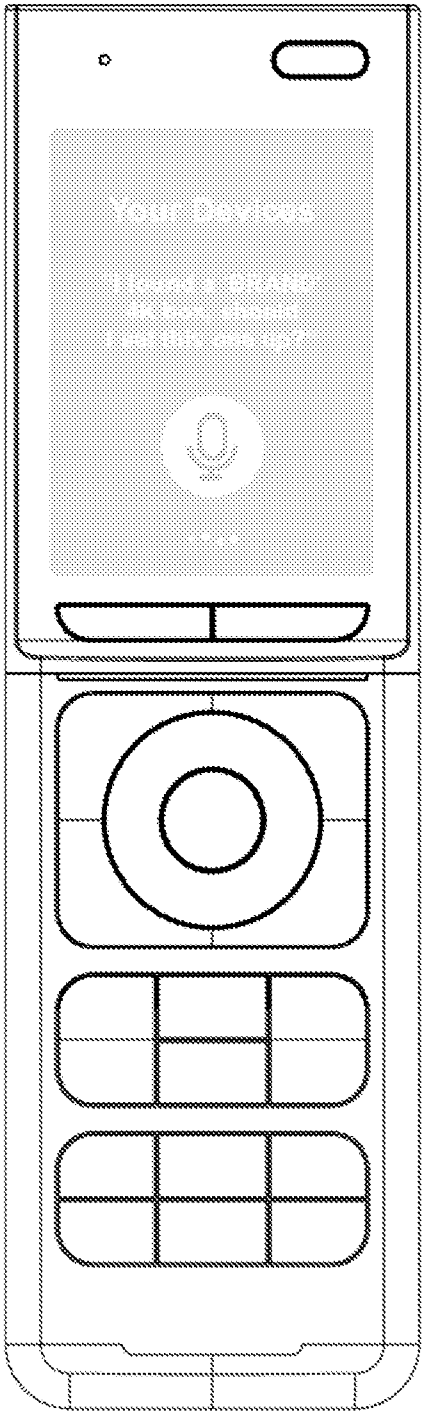
Figure 11:
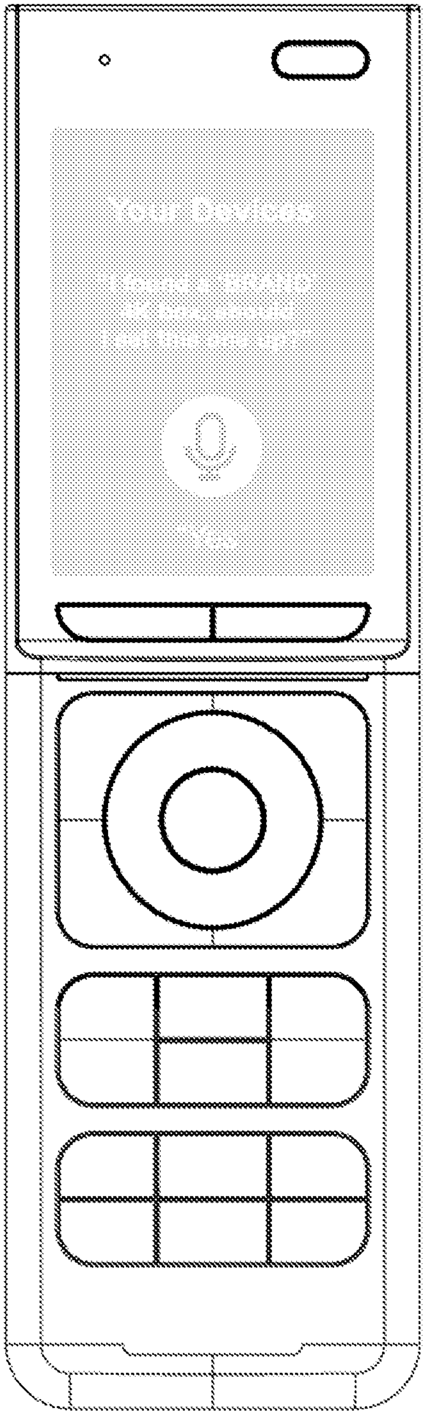
Figure 12:
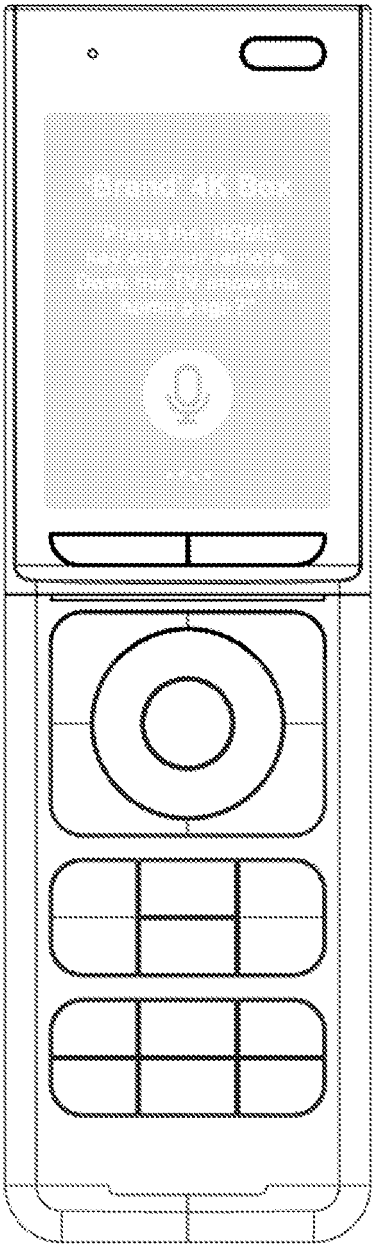
Figure 13:
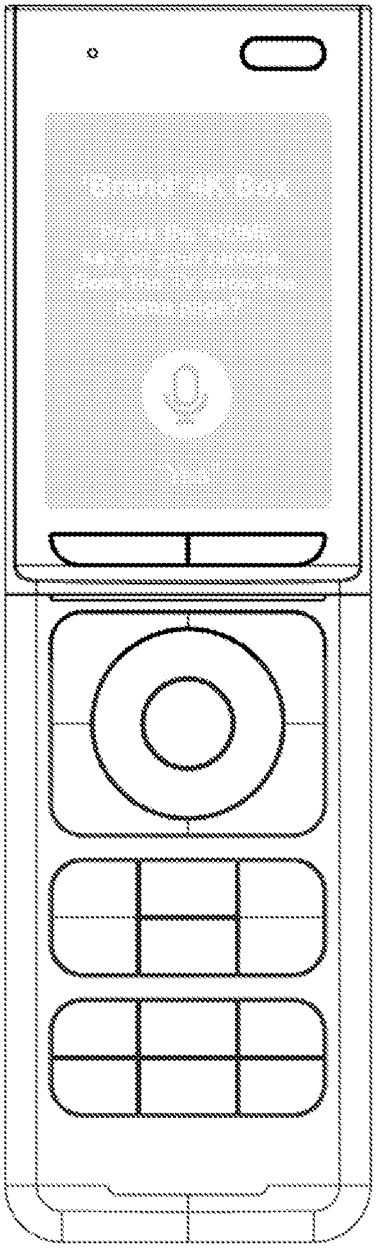

Upon completion of the auto-detection process, the app will display to the user, in one or more display screens, an identification of each controllable devices that the app has detected. In addition or alternatively, the identity of the discovered controllable device may be voiced to the user. In either case, the user will be provided with an opportunity to review the results of the discovery process and to request that the app be setup for use in commanding controllable functions of the one or more of the controllable devices discovered as shown in FIGS. 10 and 11. As before, a conformation of the verbally provided permission may be presented back to the user, for example by being displayed or by being voiced. During the setup process, the app may request that the user test one or more of the controllable functions to ensure that the command code set selected for use in controlling the controllable device of the disclosure type, brand, and model is correct as shown in FIGS. 12 and 13. A confirmation of the user's response that the controllable device did (or did not) response as expected can be presented back to the user. In the event that the device did not response as expected, the process can be repeated with the app using a further command code set for testing. Multiple, different commands may be required to be tested before the app finalizes a selected command code set for use in issuing commands to the controllable device. It will also be understood that this testing process may be repeated for each controllable device that the app is to be setup to control.

Figure 14:
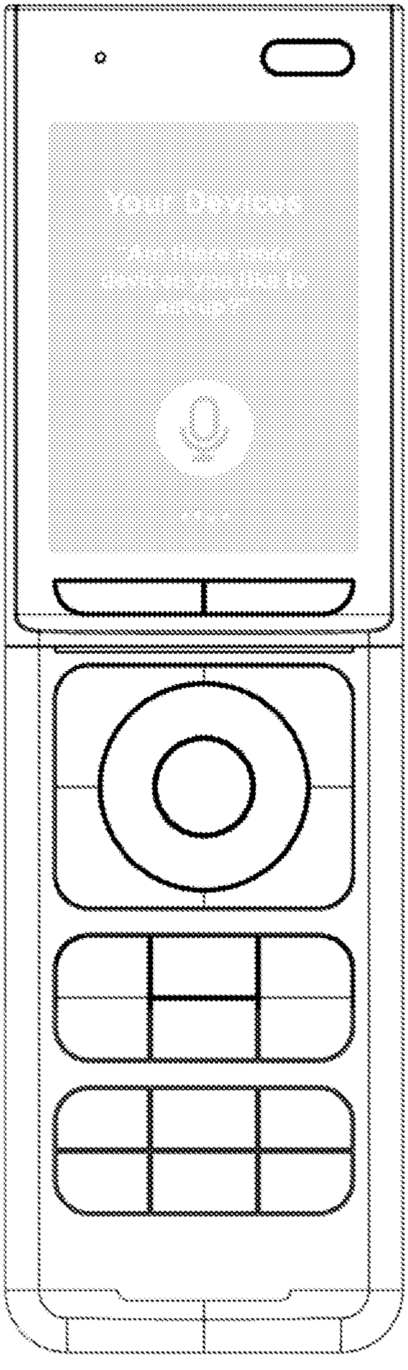
Figure 15:
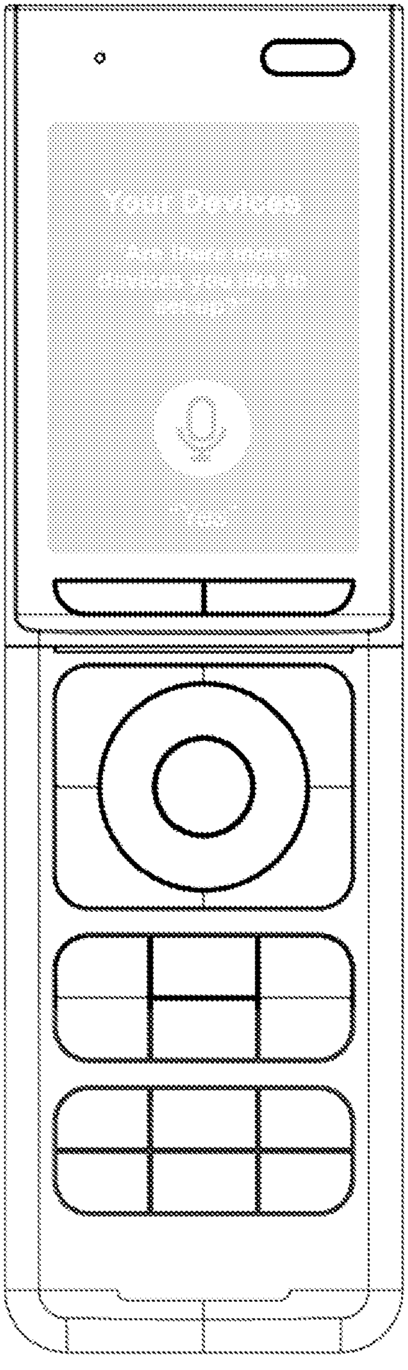
Figure 16:
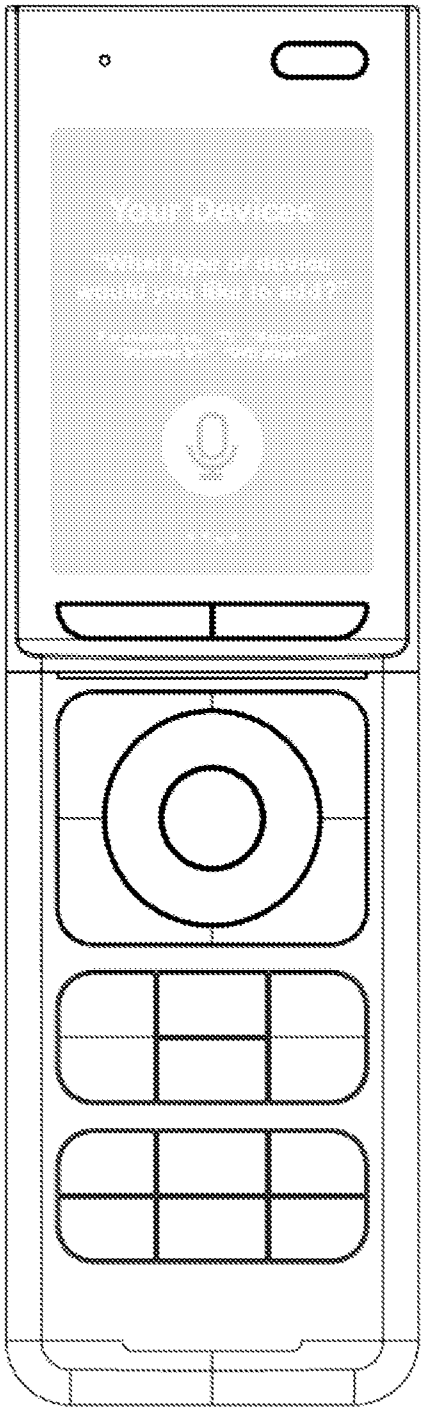
Figure 17:
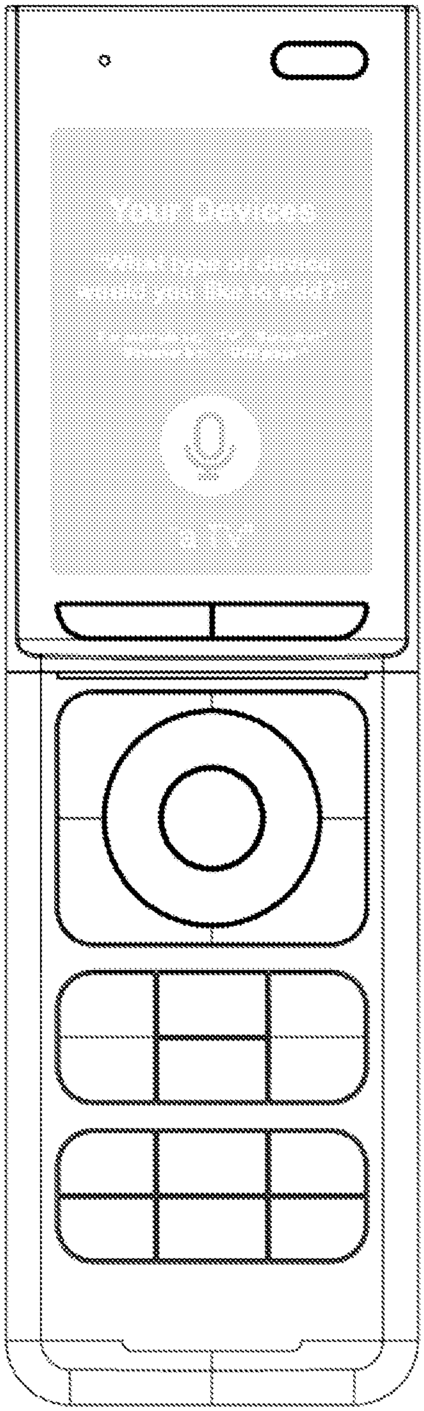
Figure 18:
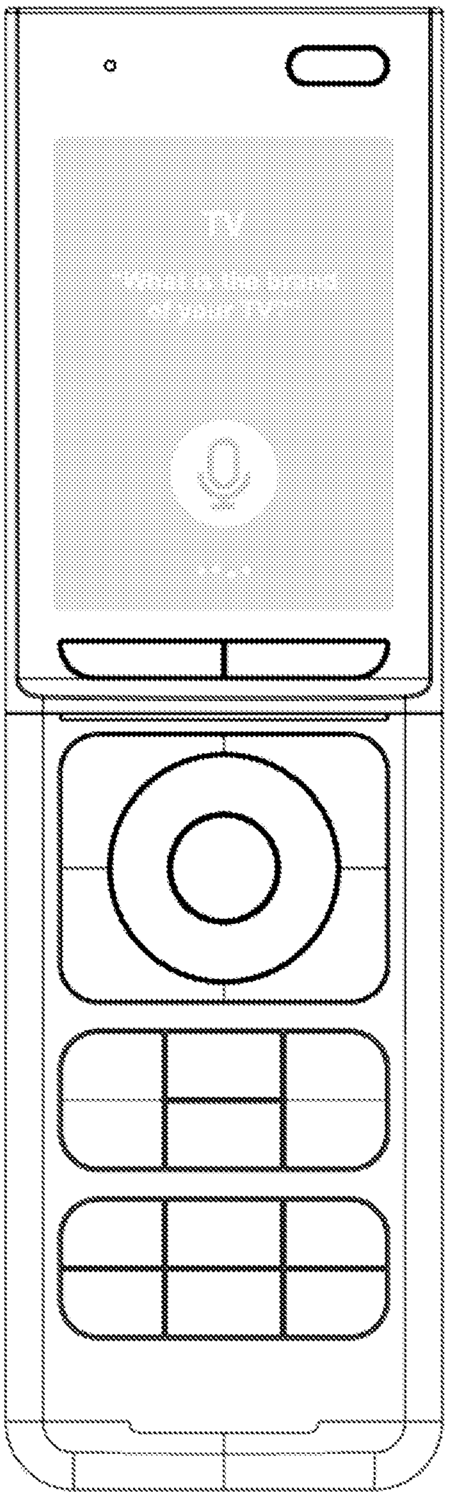
Figure 19:
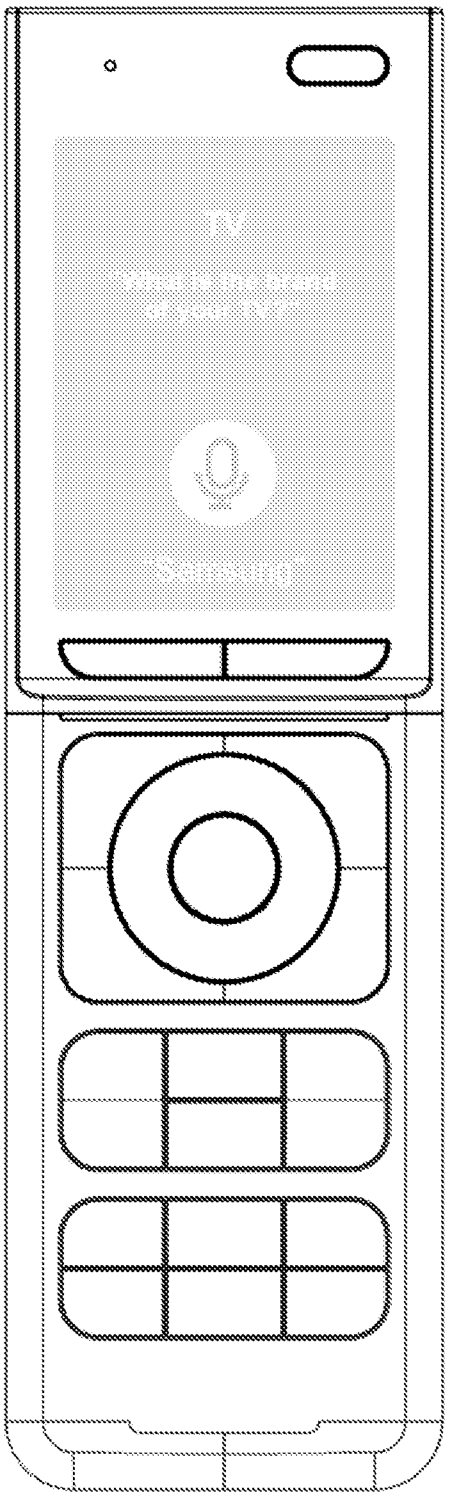
Figure 20:
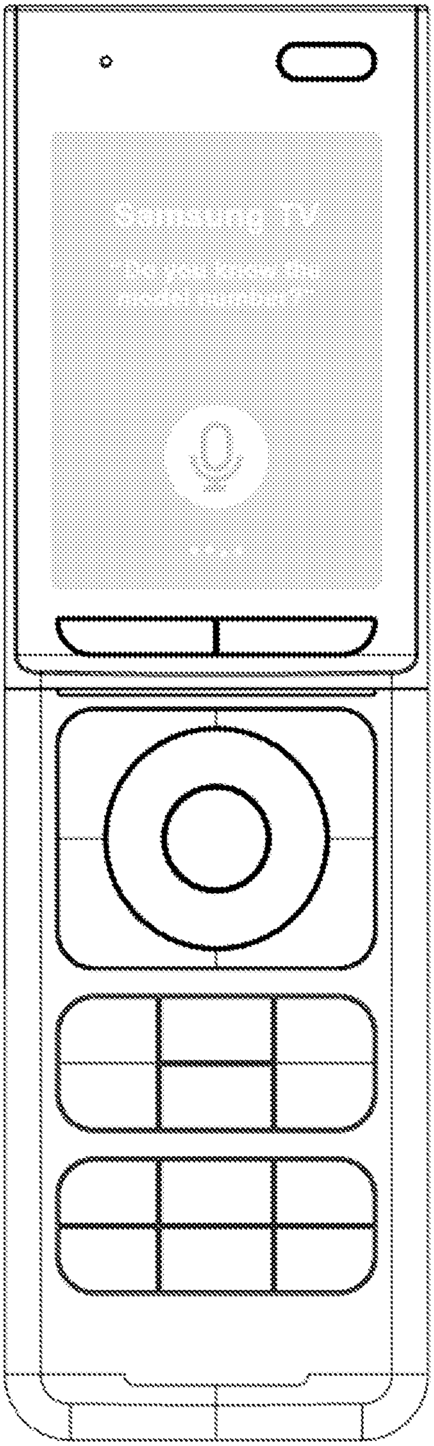
Figure 21:
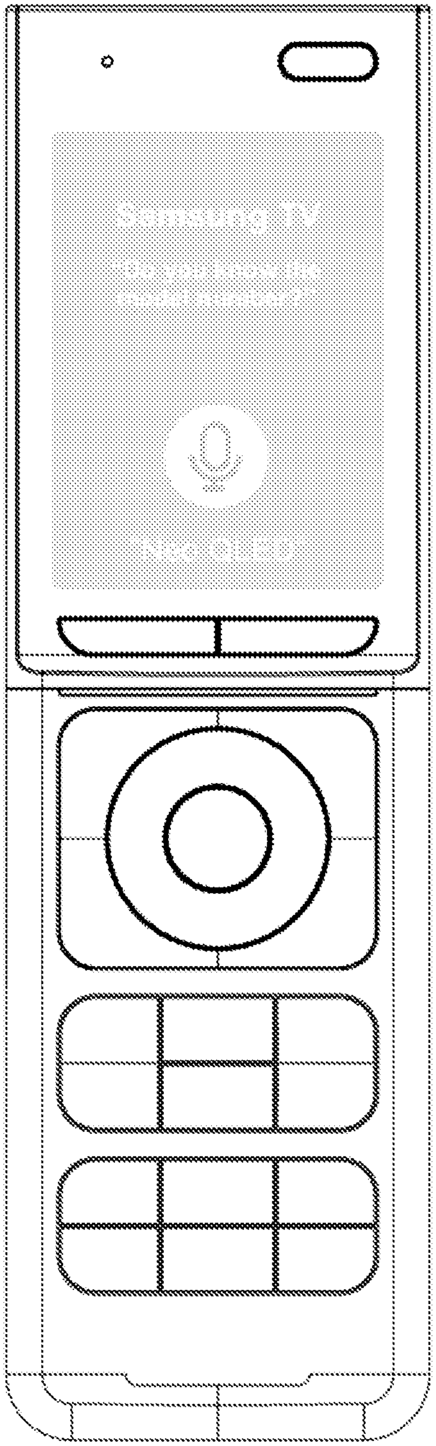
Figure 22:
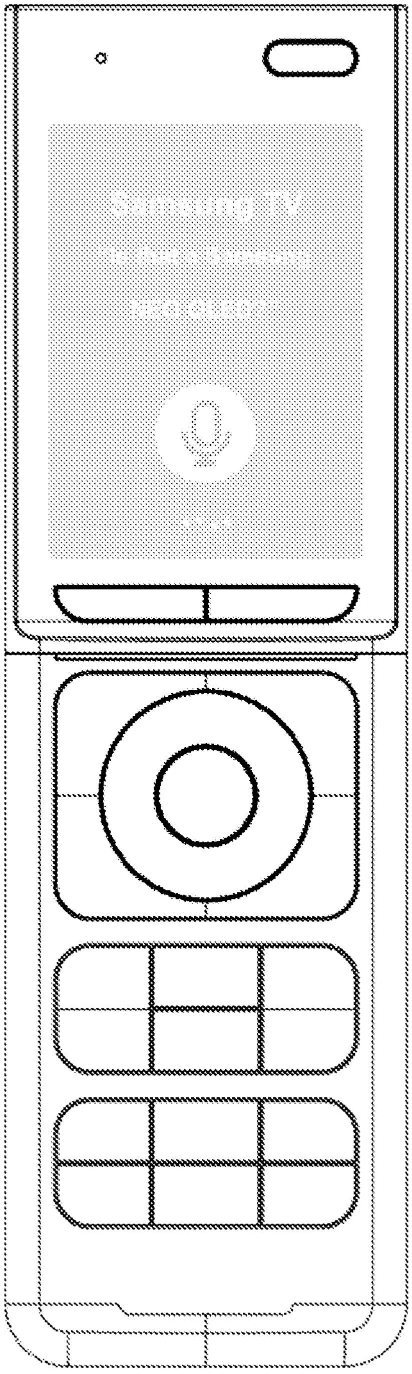
Figure 23:
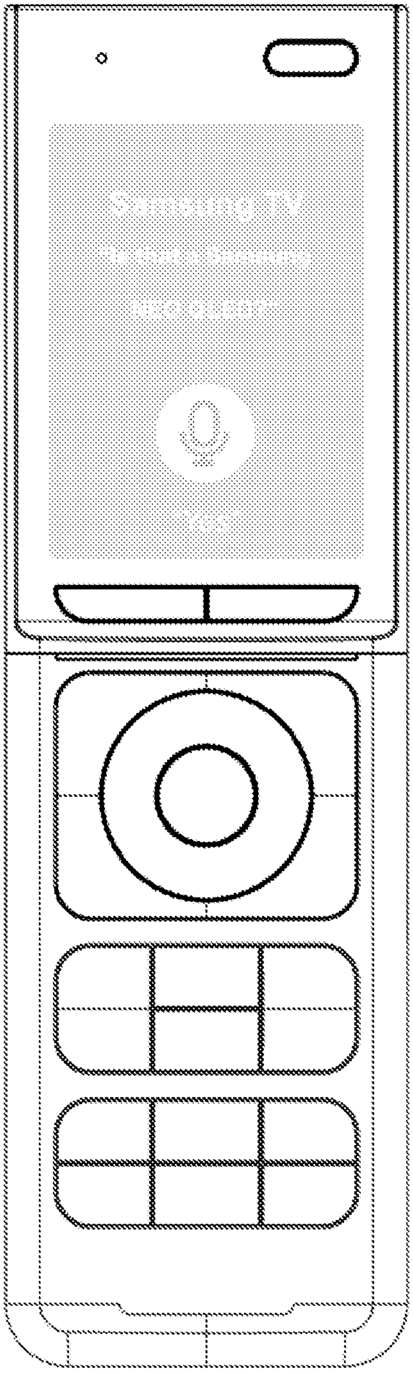
Figure 24:
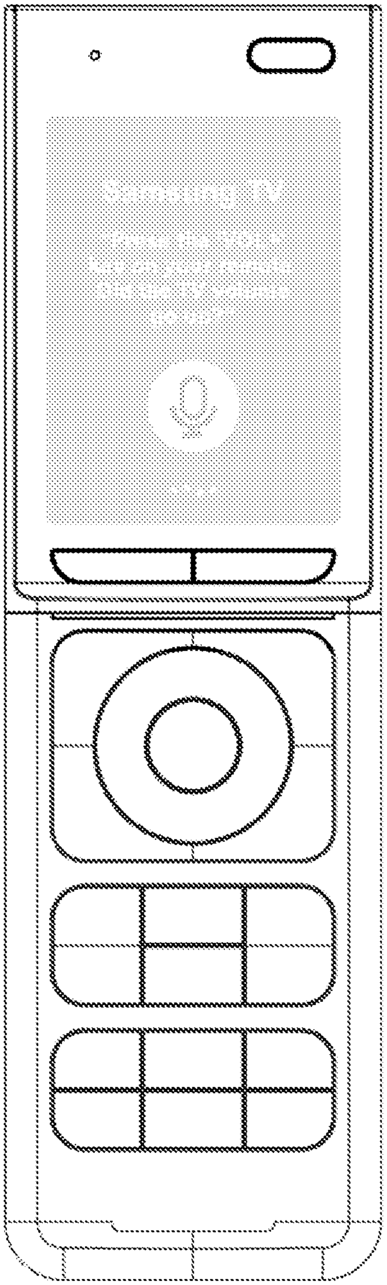
Figure 25:
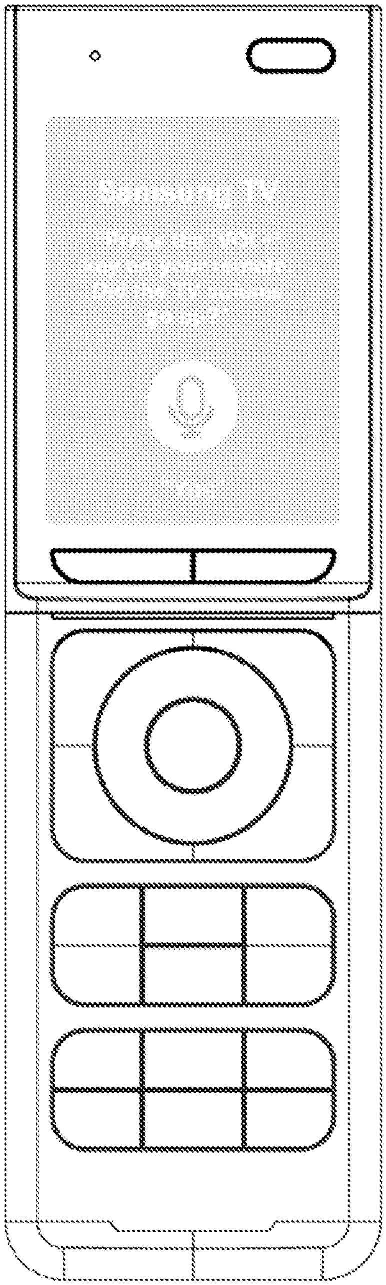
Figure 26:
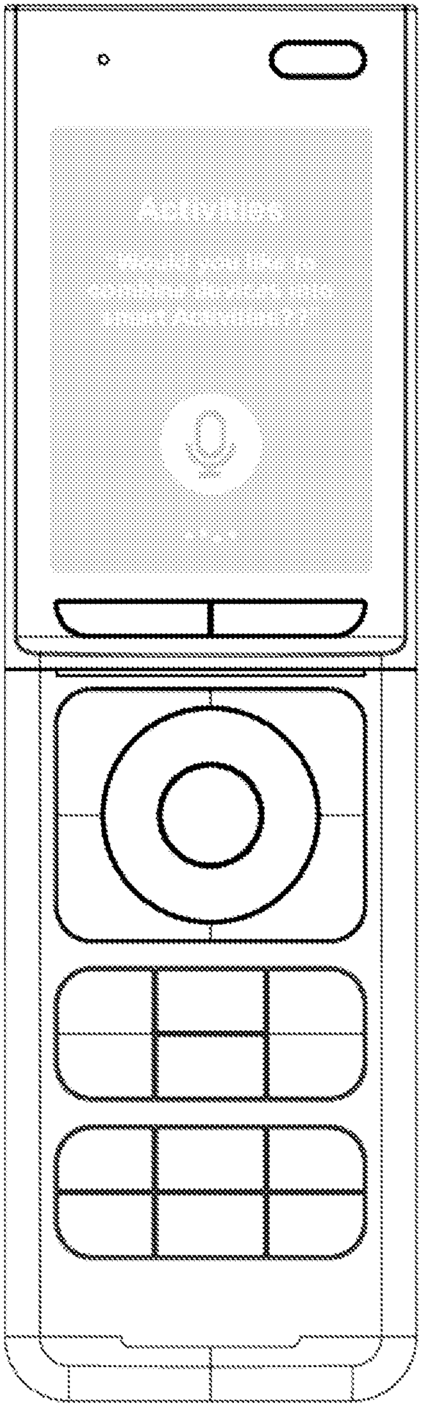
FIGS. 26-36 illustrate user interfaces provided to facilitate configuring an app for using in controlling an activity associated with one or more controllable appliances.
Figure 27:
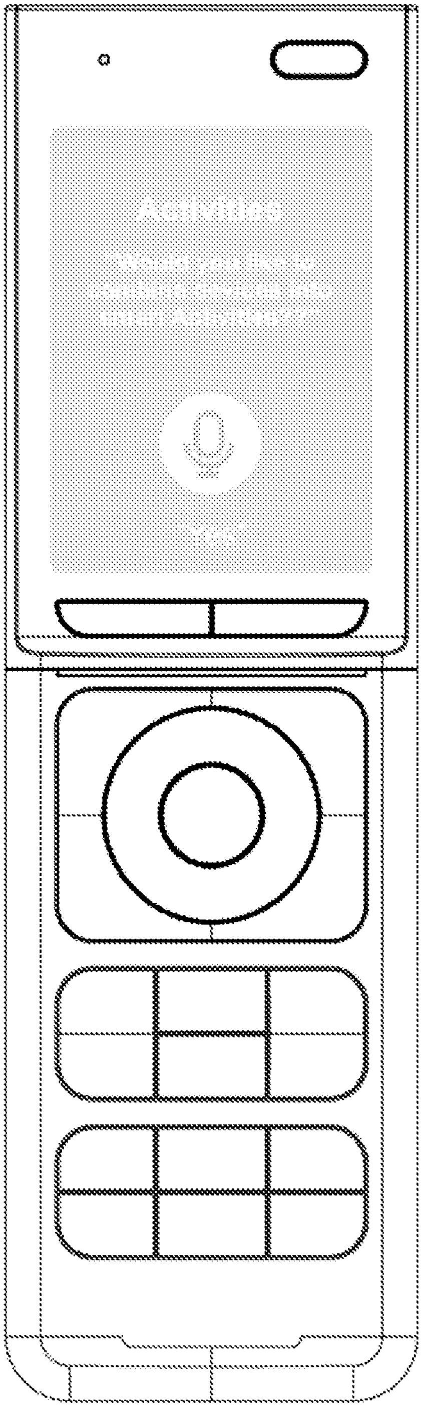
Figure 28:
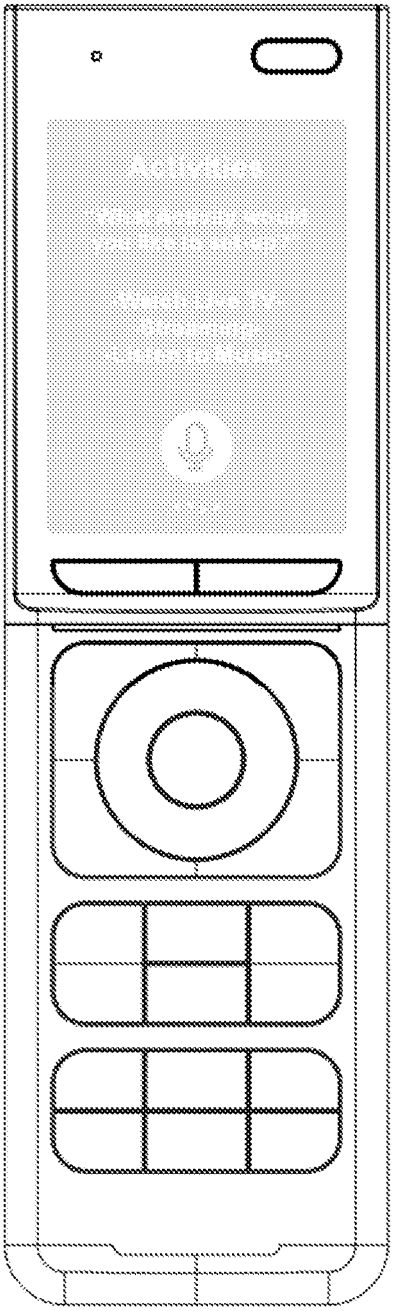
Figure 29:
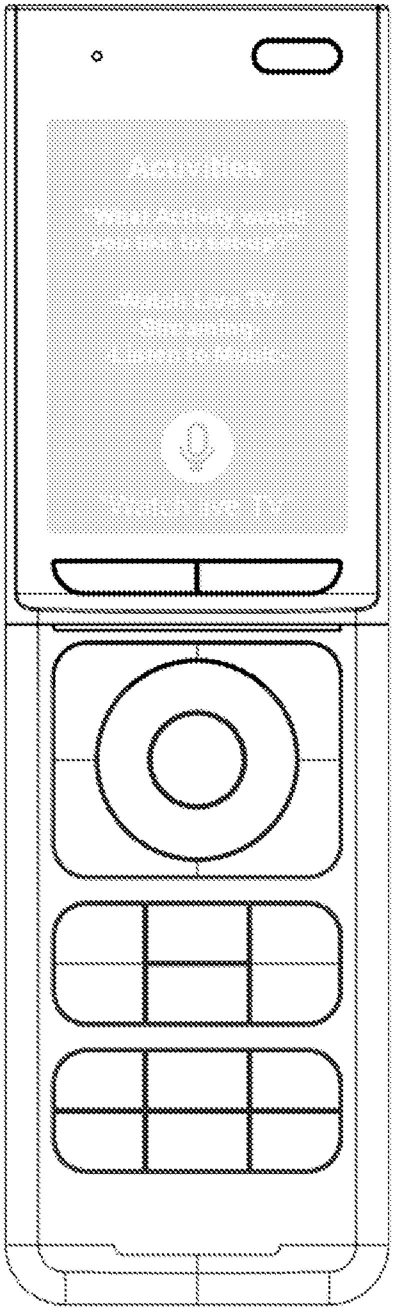
Figure 30:
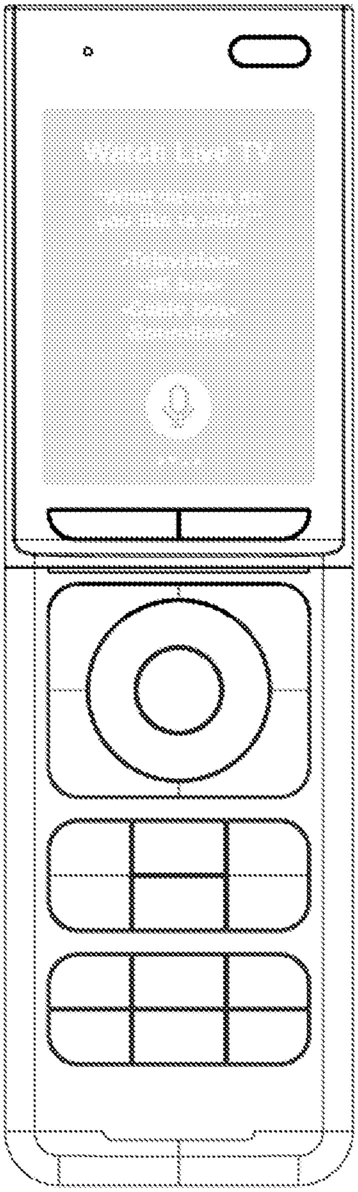
Figure 31:
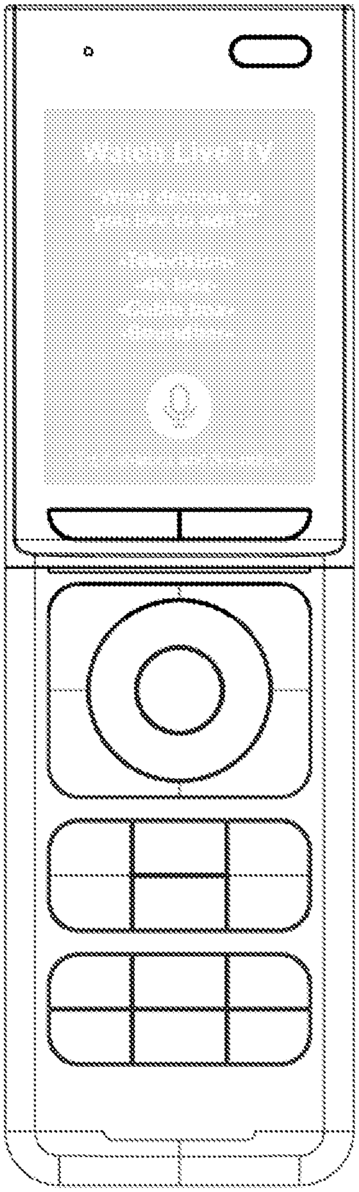

The app will additionally provide the user with an opportunity to setup the app to control functional operations of one or more devices that were not discovered or are incapable of being discovered. To this end, the user may be asked if the app is to be setup for use in controlling additional appliances, with the user's response being echoed back to the user as shown in FIGS. 14 and 15. If no additional appliances are to be setup, the app may proceed to the activity setup process which is illustrated in FIGS. 26+. If an additional appliance is to be setup, the app may request that the user speak the type, brand, and model of the device that is to be controlled, with the user's input again being echoed back to the user as shown in FIGS. 16-23. The app may then request that the user test one or more commands from one or more command code sets that were caused to be selected based on the user input as shown in FIGS. 24-25. As before, multiple devices may be added in this manner, multiple test commands may be utilized, and multiple command codes sets may be tested as the app is setup to control the functional operations of a given controllable appliance.

Once the controlling device app has been setup to control controllable devices, the app may commence an activities setup process as illustrated in FIGS. 26-36. To this end, the setup app may inquire if the user desires to setup one or more activities and, if the user responds in the affirmative, the setup app may present the user with a listing of possible activities that can be configured. Upon the user selecting a one of the activities, the user may be requested to indicate which appliances are to be used in the activity that was selected. As before, a user's selection/response is preferably echoed back to the user for confirmation by the user.

Figure 32:
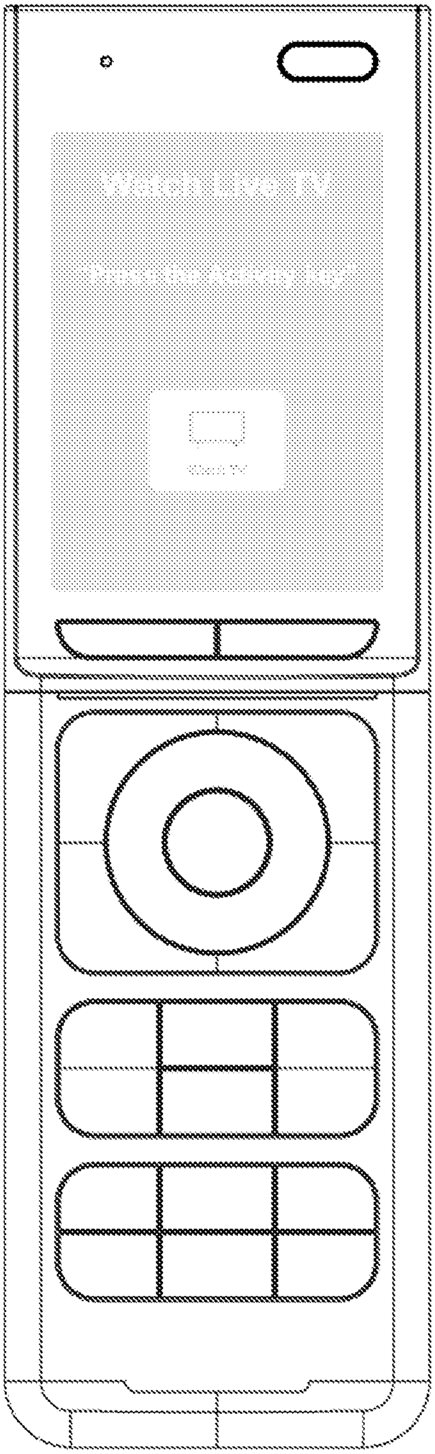
Figure 33:
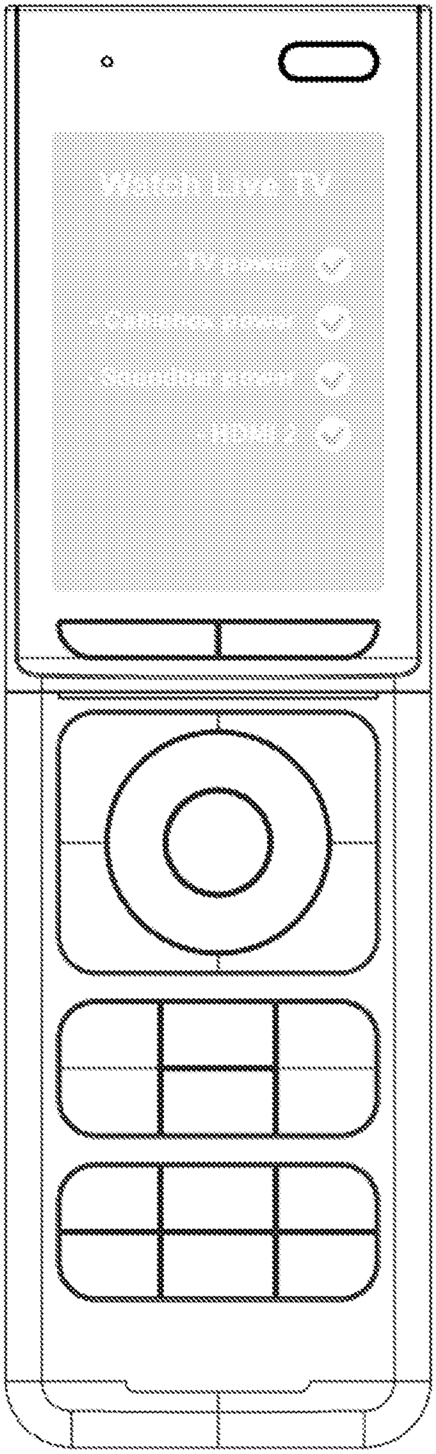
Figure 34:
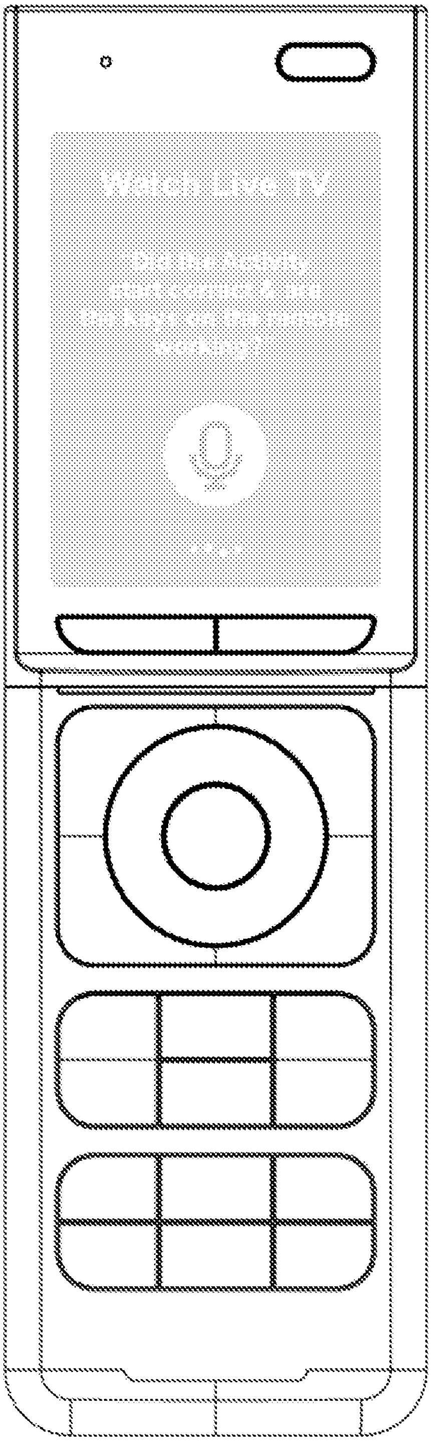
Figure 35:
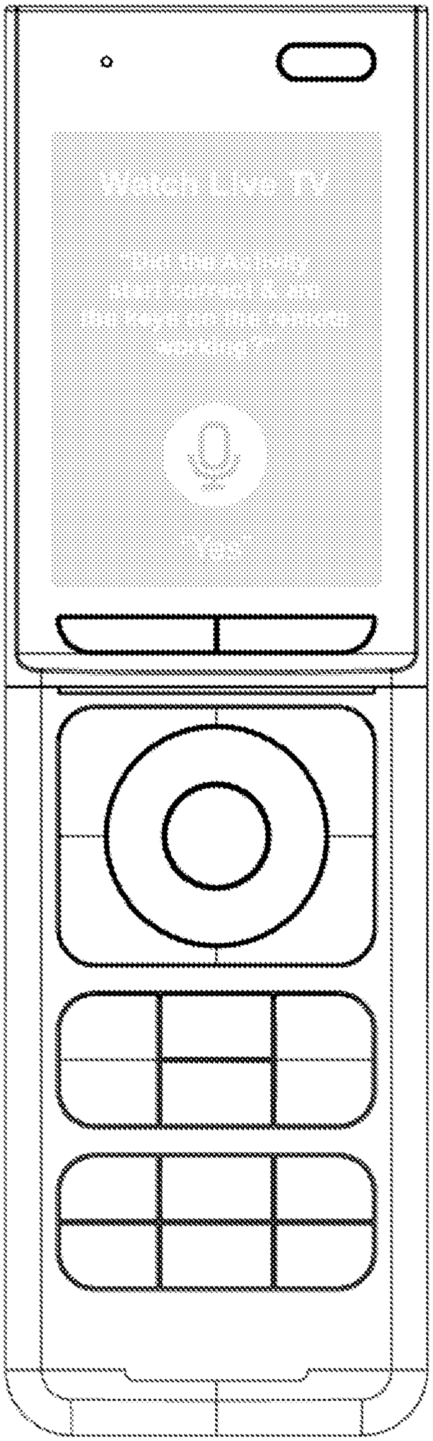
Figure 36:
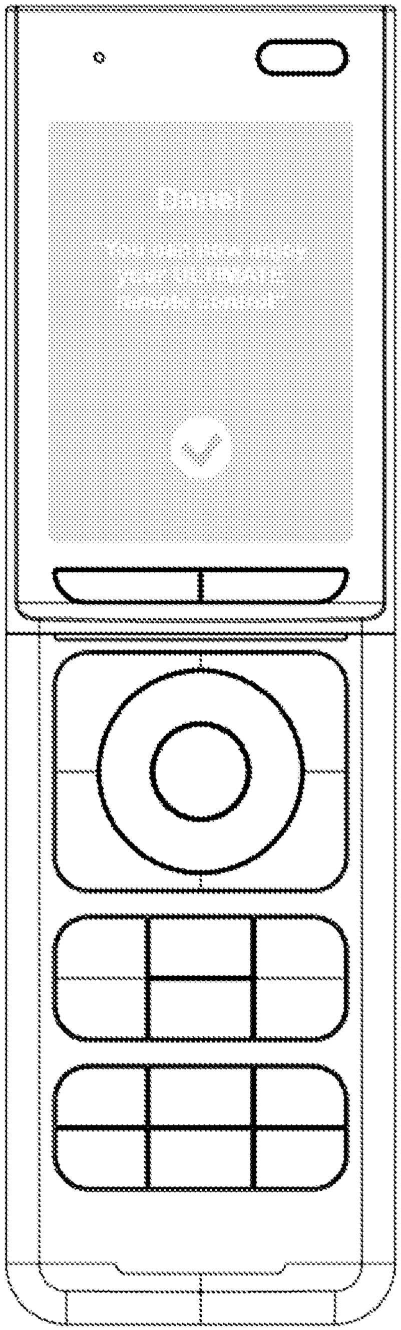

With the selection of the activity to be configured and the one or more appliances that are to be used in connection with the activity, the app may show the user the activity key that will be added to the home page of the remote control app (as shown in FIG. 32) and may present to the user the functions that will be controlled when that activity key is activated. The system may automatically determine the functions that are to be associated with an activity based upon the capabilities of the appliances that the user indicated are to be included in the activity and/or by using information that was obtained from the appliances during the setup process, for example, the input/output ports that need to be selected to ensure that the appliances are coupled as needed to perform the activity. The user may edit (select/deselect) the functions to be included in the activity, may manually inform the system of functions to be controlled in performing the activity, and the like without limitation. Once the functions have been specified to the app, the app may again request that the user test and confirm the performance of the functions as shown in FIGS. 34 and 35. If the testing is indicated to be successful the app may exit the setup process as shown in FIG. 36. If the testing is indicated to be unsuccessful, the user may indicate other functions to include and/or exclude from the activity (with the newly configured activity to again be tested) or simply indicate that the user no longer has a desire to add this activity.

While various concepts have been described in detail, it will be appreciated by those skilled in the art that various modifications and alternatives to those concepts could be developed in light of the overall teachings of the disclosure.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A non-transitory, computer readable media having stored thereon instructions wherein the instructions, when executed by a processing device of a controlling device, cause the controlling device to:

perform an auto-discovery function to obtain from a first target appliance coupled to the controlling device via a local area network at least a type for and a brand of the first target appliance;

present to a user an indication of the at least a type for and the brand of the first target appliance;

receive a first verbal confirmation from the user that the at least a type for and the brand of the first target appliance is correct;

echo back to the user the first verbal confirmation received from the user;

when the first verbal confirmation indicates that the at least a type for and the brand of the first target appliance is correct, select a one of a plurality of command code sets, present to the user a request to test one or more commands selected from the one of the plurality of command code sets, receive a second verbal confirmation from the user that the test command was successfully received by the first target appliance, echo back to the user the second verbal confirmation received from the user, and, when the second verbal confirmation indicates that the test command was successfully received by the first target appliance, use the one of the plurality of command code sets when the controlling device placed into an operational mode used to control the first target appliance.

2. The non-transitory, computer readable media as recited in claim 1, wherein the instructions cause the controlling device to use voice data indicative of at least a type for and a brand of a second target appliance to select a further one of the plurality of command code sets, present to the user a request to test one or more commands selected from the further one of the plurality of command code sets, receive a third verbal confirmation from the user that the test command was successfully received by the second target appliance, echo back to the user the third verbal confirmation received from the user, and, when the third verbal confirmation indicates that the test command was successfully received by the second target appliance, use the further one of the plurality of command code sets when the controlling device placed into an operational mode used to control the second target appliance.

3. The non-transitory, computer readable media as recited in claim 1, wherein the controlling device comprises a smart device.

4. The non-transitory, computer readable media as recited in claim 3, wherein the first target appliance comprises a television.

5. The non-transitory, computer readable media as recited in claim 1, wherein the one of the plurality of command code sets is associated with a one of an infrared, radio-frequency, point-to-point, or networked protocol by which commands are to be transmitted by the controlling device when commanding functional operations of the first target appliance.

6. The non-transitory, computer readable media as recited in claim 1, wherein the instructions comprise a remote control app installed on the controlling device.

7. The non-transitory, computer readable media as recited in claim 1, wherein the instructions cause the controlling device to present to a user a listing of functions controllable in an activity that uses at least one function associated with the first target appliance, request the user to test the functions controllable in the activity, receive a third verbal confirmation from the user that the functions controllable in the activity were performed when tested, echo back to the user the third verbal confirmation received from the user, and, when the third verbal confirmation indicates that the functions controllable in the activity were performed when tested, populate a user interface of the controlling device with an icon representative of the activity whereupon an activation of the icon will cause the controlling device to control the functions controllable in the activity.

* * * * *